US012621496B2

(12) United States Patent
Xiu et al.

(10) Patent No.: US 12,621,496 B2
(45) Date of Patent: *May 5, 2026

(54) METHODS AND APPARATUS OF VIDEO CODING IN 4:4:4 CHROMA FORMAT

(71) Applicant: BEIJING DAJIA INTERNET INFORMATION TECHNOLOGY CO., LTD., Beijing (CN)

(72) Inventors: Xiaoyu Xiu, Beijing (CN); Yi-Wen Chen, Beijing (CN); Tsung-Chuan Ma, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 23 days.

This patent is subject to a terminal disclaimer.

(21) Appl. No.: 18/763,495

(22) Filed: Jul. 3, 2024

(65) Prior Publication Data

US 2024/0364931 A1     Oct. 31, 2024

Related U.S. Application Data

(63) Continuation of application No. 17/716,971, filed on Apr. 8, 2022, now Pat. No. 12,069,311, which is a
(Continued)

(51) Int. Cl.
*H04N 19/70*        (2014.01)
*H04N 19/12*        (2014.01)
(Continued)

(52) U.S. Cl.
CPC ............. *H04N 19/70* (2014.11); *H04N 19/12* (2014.11); *H04N 19/132* (2014.11);
(Continued)

(58) Field of Classification Search
CPC ...... H04N 19/70; H04N 19/12; H04N 19/132; H04N 19/136; H04N 19/174; H04N 19/186; H04N 19/30; H04N 19/60
See application file for complete search history.

(56) References Cited

U.S. PATENT DOCUMENTS

2012/0213434 A1     8/2012 Fukuhara et al.
2012/0301041 A1    11/2012 Kotaka
(Continued)

FOREIGN PATENT DOCUMENTS

CN          101335897 A     12/2008
CN          106105202 A     11/2016
(Continued)

OTHER PUBLICATIONS

Beijing Dajia Internet Information Technology Co. Ltd., CN202210734580, First Office Action, Jan. 28, 2023, 7 pgs.
(Continued)

*Primary Examiner* — Jae N Noh
(74) *Attorney, Agent, or Firm* — Myers Bigel, P.A.

(57)          ABSTRACT

An electronic apparatus performs a method of decoding video data, including receiving, from bitstream, a first syntax element in a slice header of a slice that indicates whether luma mapping with chroma scaling (LMCS) is applied to a coding unit in the slice; receiving a second syntax element for the coding unit that indicates whether the coding unit has been coded using adaptive color-space transform (ACT); if the second syntax element has a non-zero value, decoding the coding unit by applying inverse ACT to convert luma and chroma residuals of the coding unit from a transformed color space to an original color space of the video data; and if the first syntax element has a non-zero value, decoding the coding unit by performing inverse luma mapping to the luma
(Continued)

samples and inverse scaling to the chroma residuals of the coding unit after performing the inverse ACT.

20 Claims, 15 Drawing Sheets

Related U.S. Application Data continuation of application No. PCT/US2020/055264, filed on Oct. 12, 2020.

(60) Provisional application No. 62/923,390, filed on Oct. 18, 2019, provisional application No. 62/914,282, filed on Oct. 11, 2019.

(51) Int. Cl.

| | |
|---|---|
| *H04N 19/132* | (2014.01) |
| *H04N 19/136* | (2014.01) |
| *H04N 19/174* | (2014.01) |
| *H04N 19/186* | (2014.01) |
| *H04N 19/30* | (2014.01) |
| *H04N 19/60* | (2014.01) |

(52) U.S. Cl.
CPC ......... *H04N 19/136* (2014.11); *H04N 19/174* (2014.11); *H04N 19/186* (2014.11); *H04N 19/30* (2014.11); *H04N 19/60* (2014.11)

(56) References Cited

U.S. PATENT DOCUMENTS

| | | | | |
|---|---|---|---|---|
| 2014/0355689 A1* | 12/2014 | Tourapis | .............. | H04N 19/186 |
| | | | | 375/240.18 |
| 2015/0264354 A1 | 9/2015 | Zhang et al. | | |
| 2015/0264374 A1 | 9/2015 | Xiu et al. | | |
| 2015/0358645 A1 | 12/2015 | Thirumalai et al. | | |
| 2016/0227224 A1 | 8/2016 | Hsieh et al. | | |
| 2017/0118473 A1 | 4/2017 | Thirumalai et al. | | |
| 2017/0201769 A1 | 7/2017 | Chon et al. | | |
| 2017/0318301 A1 | 11/2017 | Li et al. | | |
| 2017/0347097 A1* | 11/2017 | Tourapis | .............. | H04N 19/136 |
| 2018/0262763 A1 | 9/2018 | Seregin et al. | | |
| 2018/0278909 A1 | 9/2018 | Andrivon et al. | | |
| 2018/0343471 A1 | 11/2018 | Jacobson et al. | | |
| 2019/0098308 A1 | 3/2019 | Li et al. | | |
| 2020/0344469 A1* | 10/2020 | Coban | .................... | H04N 19/11 |
| 2020/0389655 A1 | 12/2020 | Seregin et al. | | |
| 2021/0092415 A1 | 3/2021 | Keating et al. | | |

FOREIGN PATENT DOCUMENTS

| | | | |
|---|---|---|---|
| CN | 106105203 A | 11/2016 | |
| KR | 20160132990 A | 11/2016 | |
| WO | 2019075336 A1 | 4/2019 | |
| WO | 2019101973 A1 | 5/2019 | |

OTHER PUBLICATIONS

Beijing Dajia Internet Information Technology Co. Ltd., CN202210734580, Second Office Action, Apr. 23, 2023, 8 pgs.

Beijing Dajia Internet Information Technology Co. Ltd., EP2087493 I, European Search Report, Feb. 16, 2023, 6 pgs.

Beijing Dajia Internet Information Technology Co. Ltd., EP2087493 I, Office Action, Feb. 28, 2023, 8 pgs.

Beijing Dajia Internet Information Technology Co. Ltd., EP2087493 I, Supplemental European Search Report, Nov. 16, 2022, 13 pgs.

Beijing Dajia Internet Information Technology Co. Ltd., Examination Report, IN202247026145,Sep. 1, 2022,6pgs.

Beijing Dajia Internet Information Technology Co. Ltd., International Search Report and Written Opinion—PCT/US2020/055228, Jan. 28, 2021, 9 pgs.

Beijing Dajia Internet Information Technology Co. Ltd., Korean Search Report, KR10-2022-7015932, May 11, 2022, 20 pgs.

Beijing Dajia Internet Information Technology Co. Ltd., KR20227015932, Request for the Submission of an Opinion, Dec. 29, 2022, 13 pgs.

First Office Action, JP2022-521749, Aug. 30, 2022, 28 pgs.

Office Action for Japanese Application 2022-196669 with translation, Sep. 14, 2023, 4 pages.

Office Action for JP 2022-173829 mailed Jan. 23, 2024 (8 pages, with English translation).

Office Action for JP 2022-173829 mailed Sep. 14, 2023, with translation, 8 pages.

Proposed spec changes, 7.2.3.2 Sequence parameter set RBSP syntax, JVET-P0517WD, 8 pgs.

Alibaba Cloud Computing Ltd., Sun, et al., "CE8: WD of palette mode with neighboring pixel copy (CE8-1.1)", Document: JVET-PO0060WD, Joint Video Experts Team (JVET) of ITU-T SG 16 WP 3 and ISO/IEC JTC 1/SC 29/WG 11, 16th Meeting: Geneva, CH, Oct. 1-11, 2019, 446 pgs.

Bross, Benjamin, "Versatile Video Coding (Draft 6)", Joint Video Experts Team (NET) of ITU-T SG 16 WP 3 and ISO/IEC JTC 1/SC 29/WG 11, Document: NET-O2001-vE, 15th Meeting: Gothenburg, SE, Jul. 3-12, 2019, 18 pgs.

Bross, et al., "Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019, 459 pgs.

Bross, Benjamin, et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019.

Bross, Benjamin, et al., "Versatile Video Coding (Draft 7)", Joint Video Experts Team (JVET) of ITU-T SG 16 WP 3 and ISO/IEC JTC 1/SC 29/WG 11, 16th meeting: Geneva, CH, Oct. 1-11, 2019, 23 pages.

Chairs of JVET; Gary Sullivan; J, "Meeting Report of the 16th Meeting of the Joint Video Experts Team (JVET)" Microsoft Corp., 1 Microsoft Way, Redmond, WA 98052 USA and Institute of Communication Engineering, RWTH Aachen, Melatener StraBe, JVET-P Notes_d9, Joint Video Experts Team (JVET), of ITU-T SG 16 WP 3 and ISO/IEC JTC 1/SC 29/WG 11, 16th Meeting: Geneva, CH, Oct. 1-11, 2019, 312 pgs.

Chairs of Jvet; Gary Sullivan; J, "Meeting Report of the 16th Meeting of the Joint Video Experts Team (JVET)", JVET-P _Notes_ d9, Microsoft Corp., 1 Microsoft Way, Redmond, WA 98052 USA and Institute of Communication Engineering, RWTH Aachen, Melatener StraBe 23, D-52074 Aachen, Joint Video Experts Team (JVET), of ITU-T SG 16 WP 3 and ISO/IEC JTC 1/SC 29/WG 11, 16th Meeting: Geneva, CH, Oct. 1-11, 2019, 313 pgs.

Gordon Clare, et al., "CE8-4.1: BDPCM and Transform skip for Chroma", NETP0059, Joint Video Experts Team (NET) of ITU-T SG 16 WP 3 and ISO/IEC JTC 1/SC 29/WG 11, 16th Meeting: Geneva, CH, Oct. 1-11, 2019, document saved: Sep. 17, 2019, 6 pgs.

Kwai Inc., Xiu, et al., "Support of adaptive color transform for 444 video coding in VVC", Document: JVET-P0517 r1, Joint Video Experts Team (JVET) of ITU-T SG 16 WP 3 and ISO/IEC JTC 1/SC 29/WG 11, 16th Meeting: Geneva, CH, Oct. 1-11, 2019, 7 pgs.

Kwai Inc., Xiu, et al., "Support of adaptive color transform for 444 video coding in VVC", Document: JVET-P0517, Joint Video Experts Team (JVET) of ITU-T SG 16 WP 3 and ISO/IEC JTC 1/SC 29/WG 11, 16th Meeting: Geneva, CH, Oct. 1-11, 2019, 4 pgs.

Li, Ling, et al., "Interaction between ACT and BDPCM chroma", Joint Video Experts Team (JVET) of ITU-T SG 16 WP 3 and ISO/IEC JTC 1/SC 29/WG 11, 17th Meeting: Brussels, BE, Jan. 7-17, 2020, 6 pages.

Orange Labs; Sony Corporation; G , "CE8-4. I: BDPCM and Transform skip for Chroma", Document: JVET-P0059-vl, Joint Video Experts Team (JVET) of ITU-T SG 16 WP 3 and ISO/IEC JTC 1/SC 29/WG 11, 16th Meeting: Geneva, CH, Oct. 1-11, 2019, 6 pgs.

Sullivan, Gary, et al., "Meeting Report of the 15th Meeting of the Joint Video Experts Team (JVET)", Joint Video Experts Team

(56) References Cited

OTHER PUBLICATIONS (NET) of ITU-T SG 16 W3 and ISO/IEC JTC 1/SC 29/WG 11, Document: JVET-O-Notes_d1, 15th Meeting: Gothenburg, SE, Jul. 3-12, 2019, 454 pgs.

Sullivan, Gary, "Meeting report of the 16th meeting of the Joint Collaborative Team on Video Coding (JCT-VC), San Jose, US, Jan. 9-17, 2014", Joint Video Experts Team (NET) of ITU-T SG 16 WP 3 and ISO/IEC JTC 1/SC 29/WG 11, Document: JCTVCPIO00, 158 pgs.

Sullivan, Gary, "Meeting Report of the 16th Meeting of the Joint Video Experts Team (JVET), Geneva, CH, Oct. 1-11, 2019", Joint Video Experts Team (NET) of ITU-T SG 16 WP 3 and ISO/IEC JTC 1/SC 29/WG 11, Document: NET-P Notes_8, 284 pgs.

Xiu, Xiaoyu, et al., "Support of adaptive color transform for 444 video coding in VVC", Joint Video Experts Team (JVET) of ITU-T SG 16 WP 3 and ISO/IEC JTC 1/SC 29/WG 11, 16th Meeting: Geneva, CH, Oct. 1-11, 2019, 6 pages.

Xiu, Xiaoyu, et al., "Support of adaptive color transform for 444 video coding in VVC", NET-P0517, Joint Video Experts Team (JVET) of ITU-T SG 16 WP 3 and ISO/IEC JTC 1/SC 29/WG 11, 16th Meeting, Geneva, CH, Oct. 1, 2019, 4 pgs.

Zhu, Weijia, et al., "Alignment of BDPCM for ACT", Joint Video Experts Team (JVET) of ITU-T SG 16 WP 3 and ISO/ IEC JTC 1/C 29/WG 11, 17th Meeting: Brussels, BE, Jan. 7-17, 2020, 8 pages.

* cited by examiner

1000 receiving, from bitstream, a first syntax element in a slice header of a slice that indicates whether luma mapping with chroma scaling (LMCS) is applied to a coding unit in the slice 1010 receiving, from the bitstream, a second syntax element for the coding unit in the slice, wherein the second syntax element indicates whether the coding unit has been coded using adaptive color-space transform (ACT) 1020 in accordance with a determination that the second syntax element has a non-zero value, decoding the video data corresponding to the coding unit by applying inverse ACT to convert luma and chroma residuals of the coding unit from a transformed color space to an original color space of the video data 1030 in accordance with a determination that the first syntax element has a non-zero value, decoding the video data corresponding to the coding unit by performing inverse luma mapping to the luma samples and inverse scaling to the chroma residuals of the coding unit after applying the inverse ACT to convert luma and chroma residuals of the coding unit 1040

FIG. 10

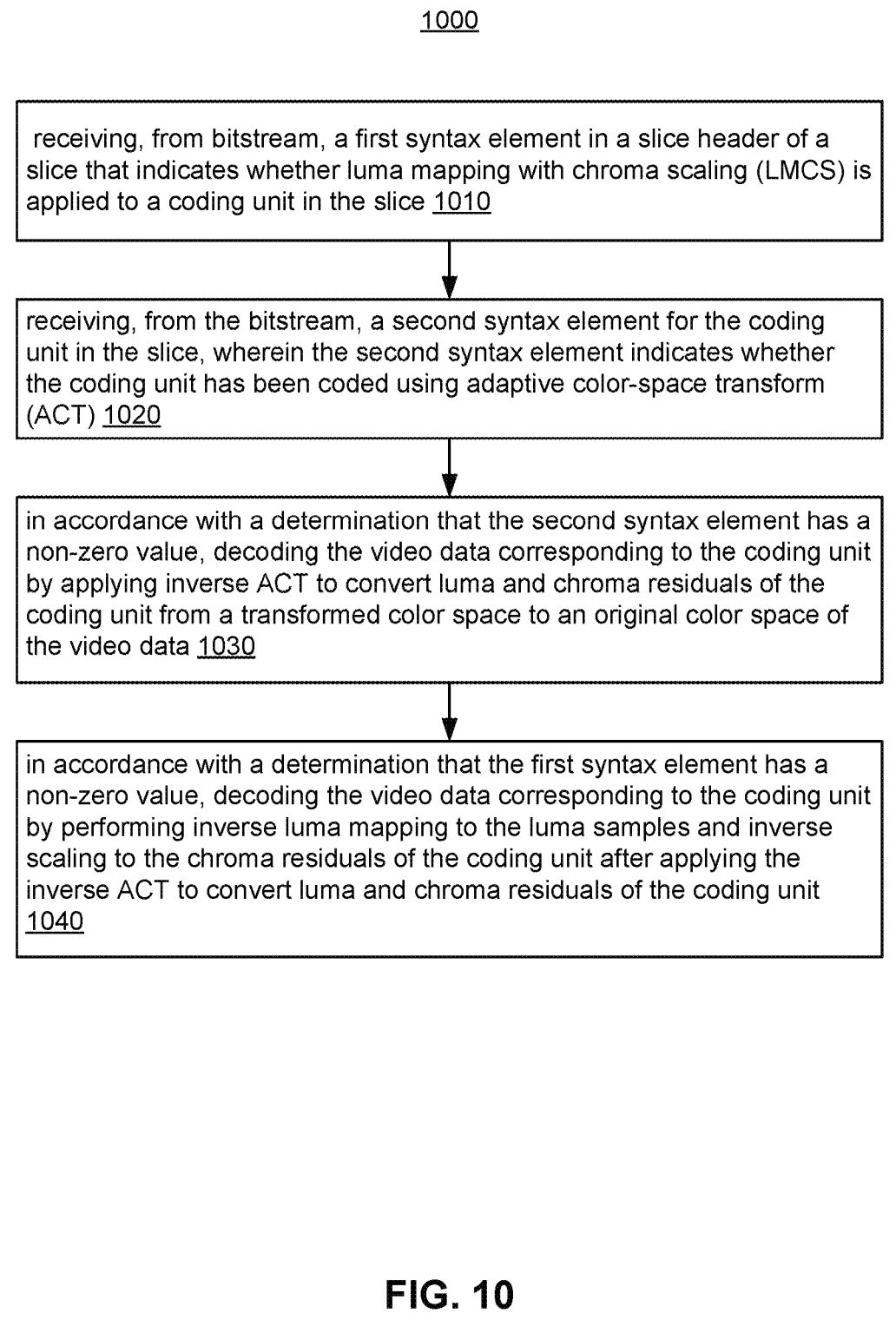

METHODS AND APPARATUS OF VIDEO CODING IN 4:4:4 CHROMA FORMAT

RELATED APPLICATIONS

The present application is a continuation of U.S. patent application Ser. No. 17/716,971, filed Apr. 8, 2022, which is a continuation of International Application No. PCT/US2020/055264, filed on Oct. 12, 2020, which claims priority to U.S. Provisional Patent Application No. 62/914,282, entitled "METHODS AND APPARATUS OF VIDEO CODING IN 4:4:4 CHROMA FORMAT" filed on Oct. 11, 2019, and also claims priority to U.S. Provisional Patent Application No. 62/923,390, entitled "METHODS AND APPARATUS OF VIDEO CODING IN 4:4:4 CHROMA FORMAT" filed on Oct. 18, 2019, both of which are incorporated by reference in their entirety.

TECHNICAL FIELD

The present application generally relates to video data coding and compression, and in particular, to method and system of performing adaptive color-space transform (ACT) with chroma residual scaling.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

Certain video content, e.g., screen content videos, is encoded in 4:4:4 chroma format in which all three components (the luma component and both chroma components) have the same resolution. Although 4:4:4 chroma format includes more redundancies compared to that in 4:2:0 chroma format and 4:2:2 chroma format (which is unfriendly to achieving a good compression efficiency), 4:4:4 chroma format is still the preferred encoding format for many applications where high fidelity is required to preserve color information, such as sharp edges, in the decoded video. Given the redundancies that exist in 4:4:4 chroma format video, there are evidences that significant coding improvement can be achieved by exploiting the correlations among the three color components of 4:4:4 video (e.g. Y, Cb and Cr in YCbCr domain; or G, B and R in RGB domain). Due to these correlations, during the development of HEVC screen content coding (SCC) extension, the adaptive color-space transform (ACT) tool is employed to exploit the correlation among three color components.

SUMMARY

The present application describes implementations related to video data encoding and decoding and, more particularly, to system and method of performing adaptive color-space transform (ACT) with luma mapping and chroma scaling (LMCS).

According to a first aspect of the present application, a method of decoding video data includes: receiving, from bitstream, a first syntax element in a slice header of a slice that indicates whether luma mapping with chroma scaling (LMCS) is applied to a coding unit in the slice; receiving a second syntax element for the coding unit that indicates whether the coding unit has been coded using adaptive color-space transform (ACT); if the second syntax element has a non-zero value, decoding the coding unit by applying inverse ACT to convert luma and chroma residuals of the coding unit from a transformed color space to an original color space of the video data; and if the first syntax element has a non-zero value, decoding the coding unit by performing inverse luma mapping to the luma samples and inverse scaling to the chroma residuals of the coding unit after performing the inverse ACT.

According to a second aspect of the present application, a method of decoding video data includes: receiving, from bitstream, video data corresponding to a coding unit, wherein the coding unit is coded by intra-prediction mode; receiving a first syntax element from the video data, wherein the first syntax element indicates whether the coding unit has been coded using adaptive color-space transform (ACT); if the first syntax element has a zero value, receiving one or more syntax elements from the video data, wherein the one or more syntax elements indicate whether the chroma components of the coding unit has been coded using block differential pulse coded modulation (BDPCM); if the first syntax element has a non-zero value, assigning default values to the one or more syntax elements associated with the BDPCM; decoding the coding unit from the video data in accordance with the first syntax element associated with the ACT and the one or more syntax elements associated with the BDPCM.

According to a third aspect of the present application, an electronic apparatus includes one or more processing units, memory and a plurality of programs stored in the memory. The programs, when executed by the one or more processing units, cause the electronic apparatus to perform the methods of decoding video data as described above.

According to a forth aspect of the present application, a non-transitory computer readable storage medium stores a plurality of programs for execution by an electronic apparatus having one or more processing units. The programs, when executed by the one or more processing units, cause the electronic apparatus to perform the methods of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 10 is a flowchart illustrating an exemplary process by which a video decoder decodes video data by performing inverse adaptive color-space transform with chroma scaling in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
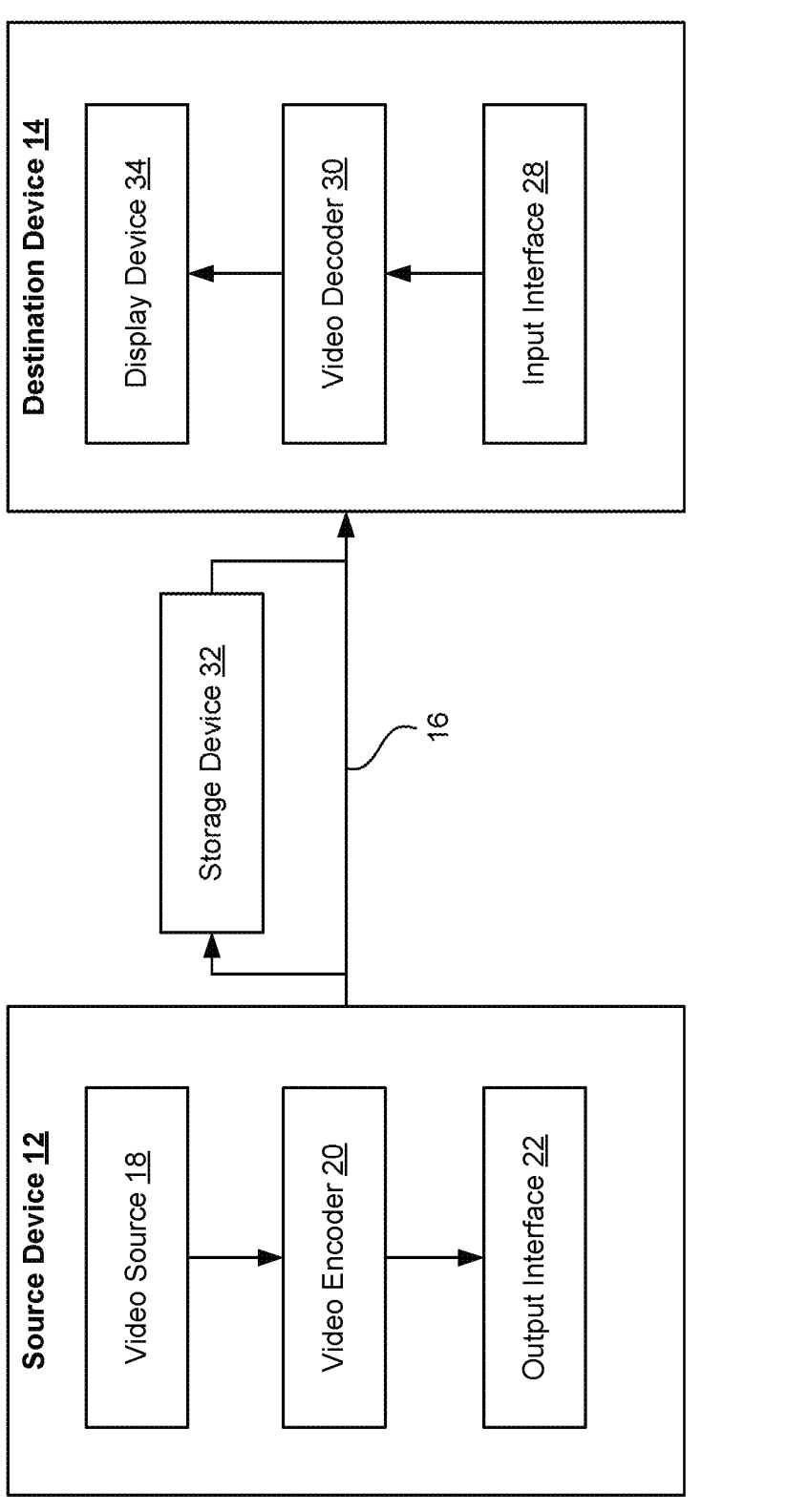
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
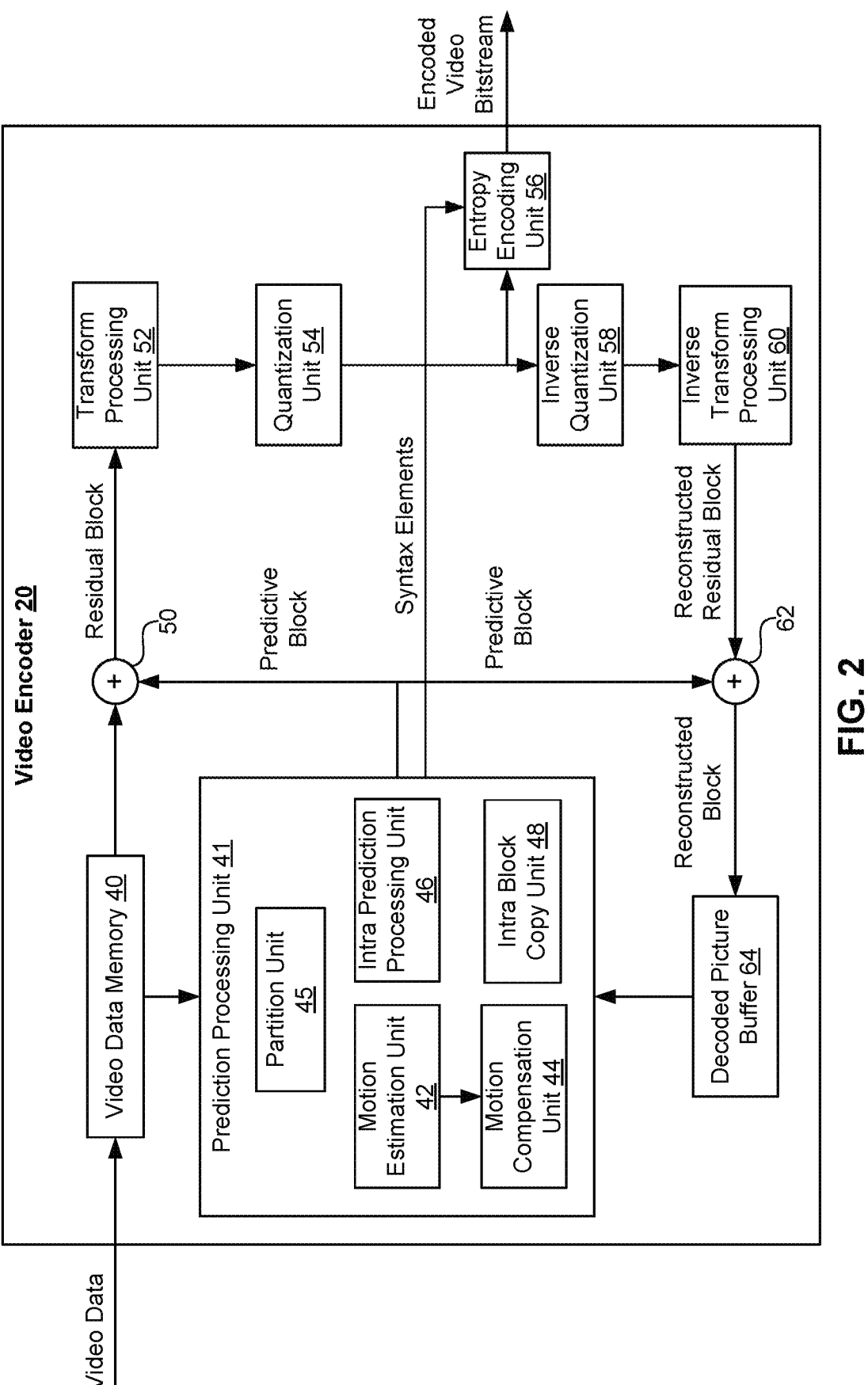
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
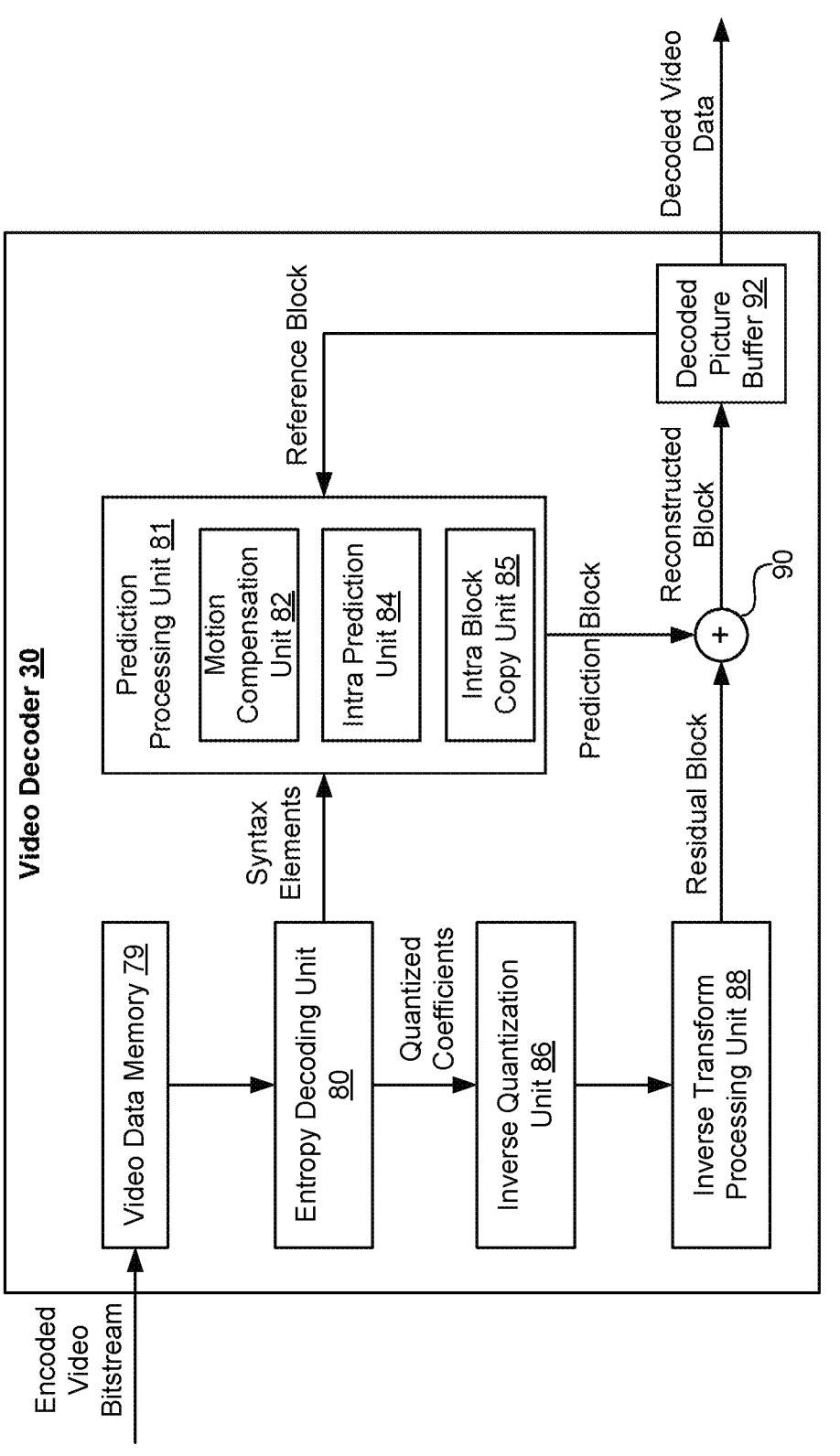
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
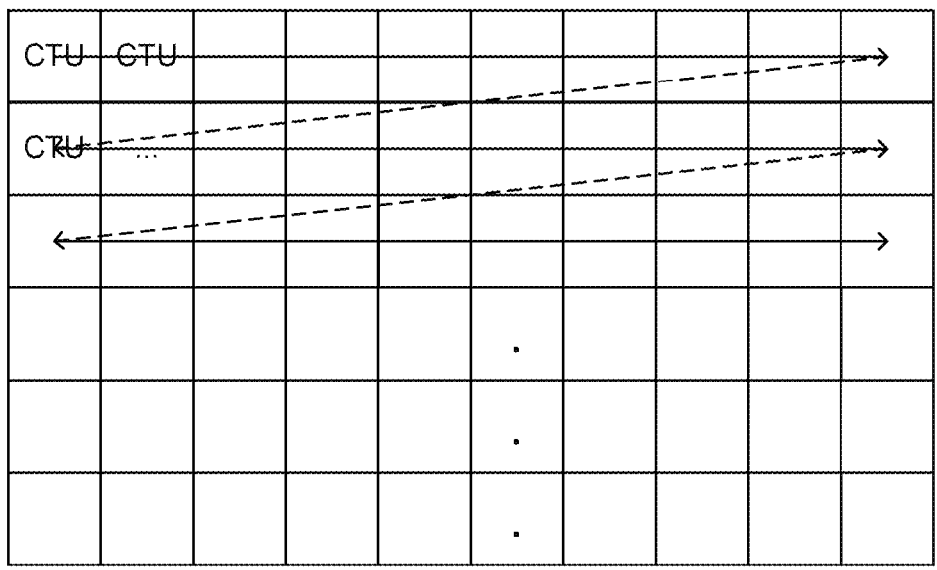
FIGS. 4A through 4E are block diagrams illustrating how a frame is recursively partitioned into multiple video blocks of different sizes and shapes in accordance with some implementations of the present disclosure.
Figure 4B:
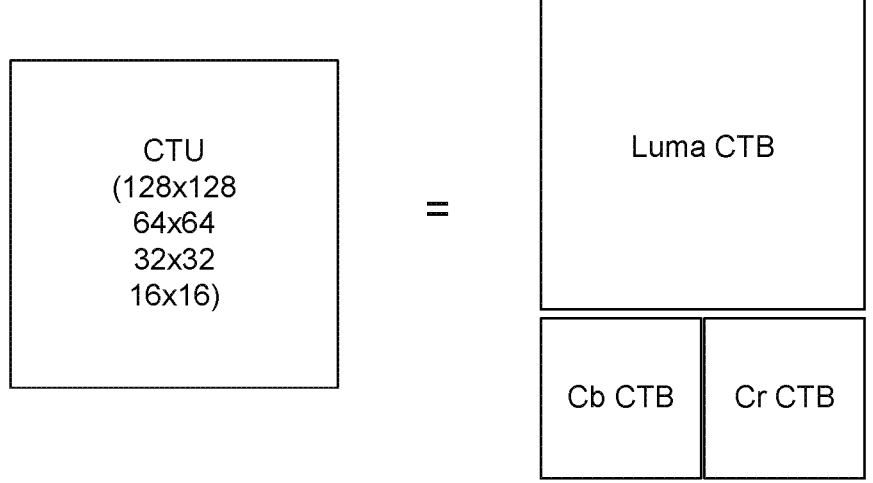

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
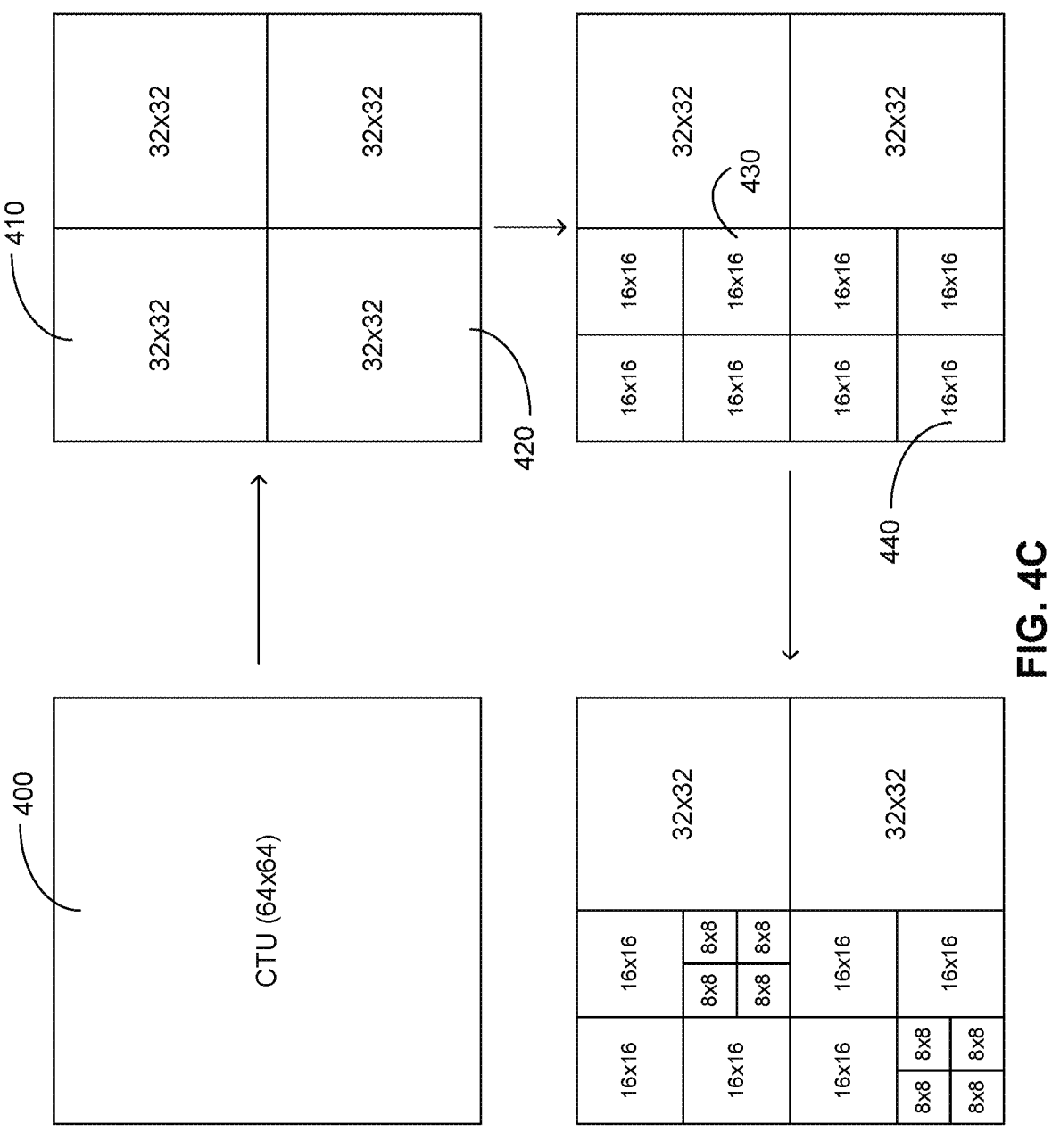
Figure 4D:
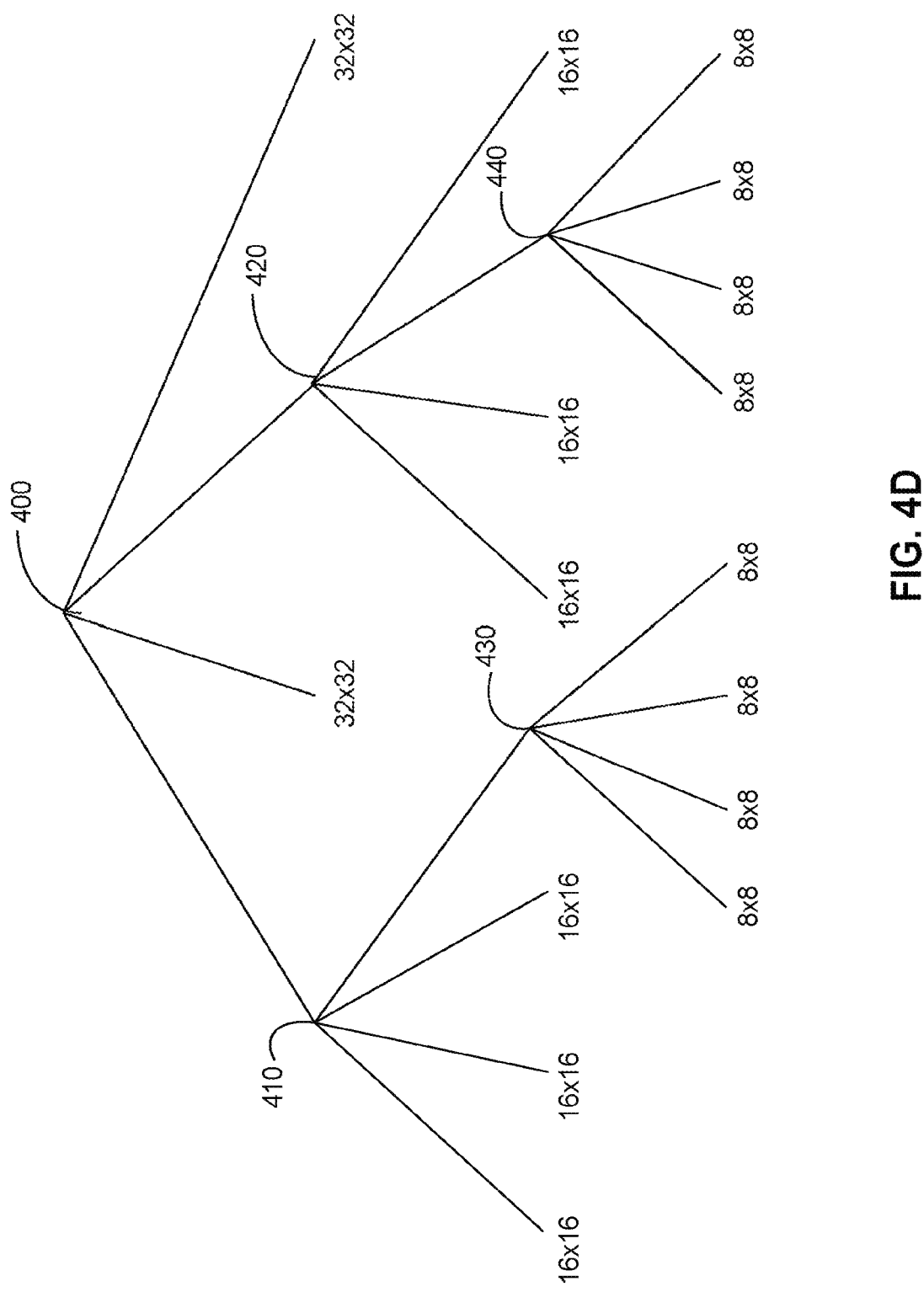
Figure 4E:
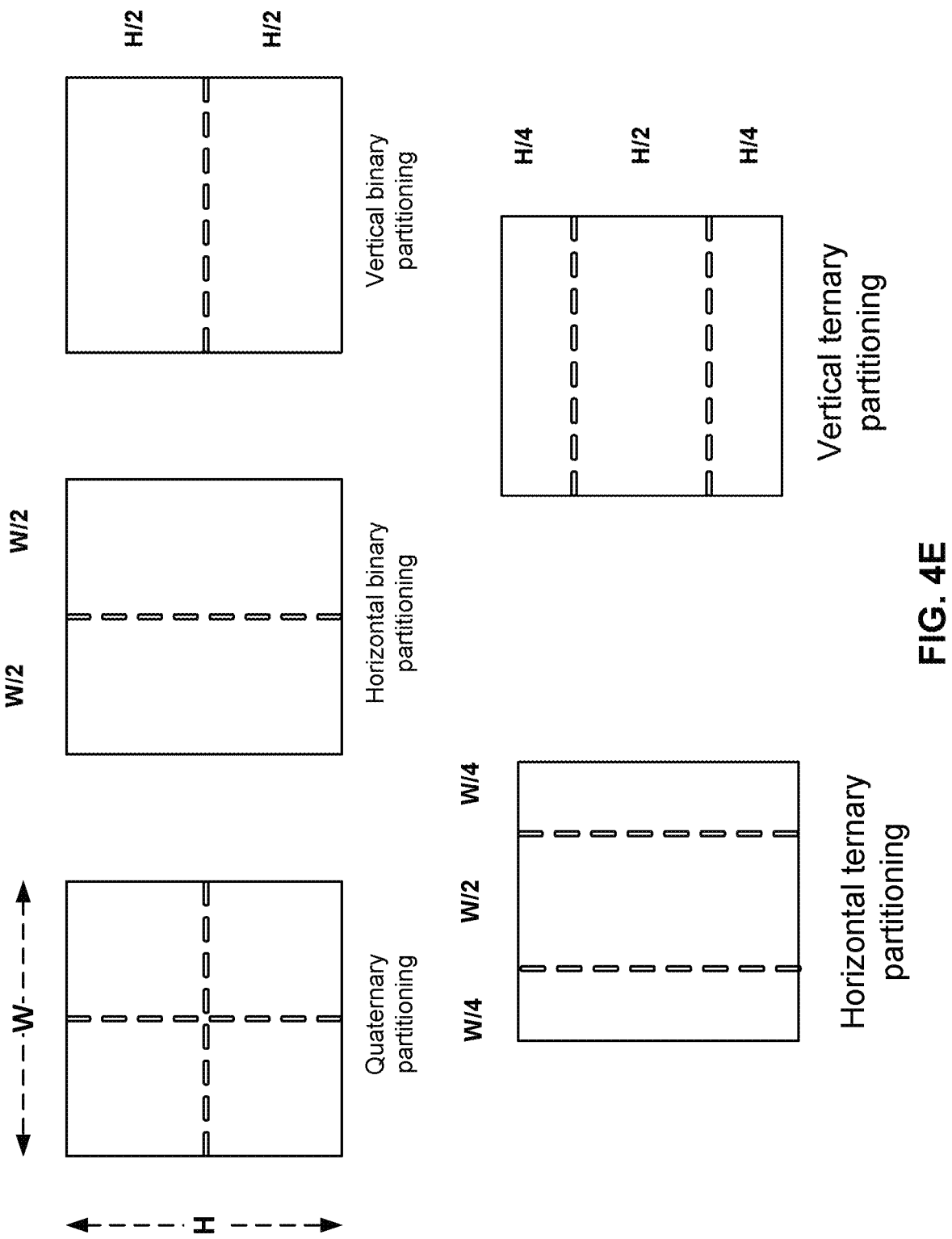

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5A:
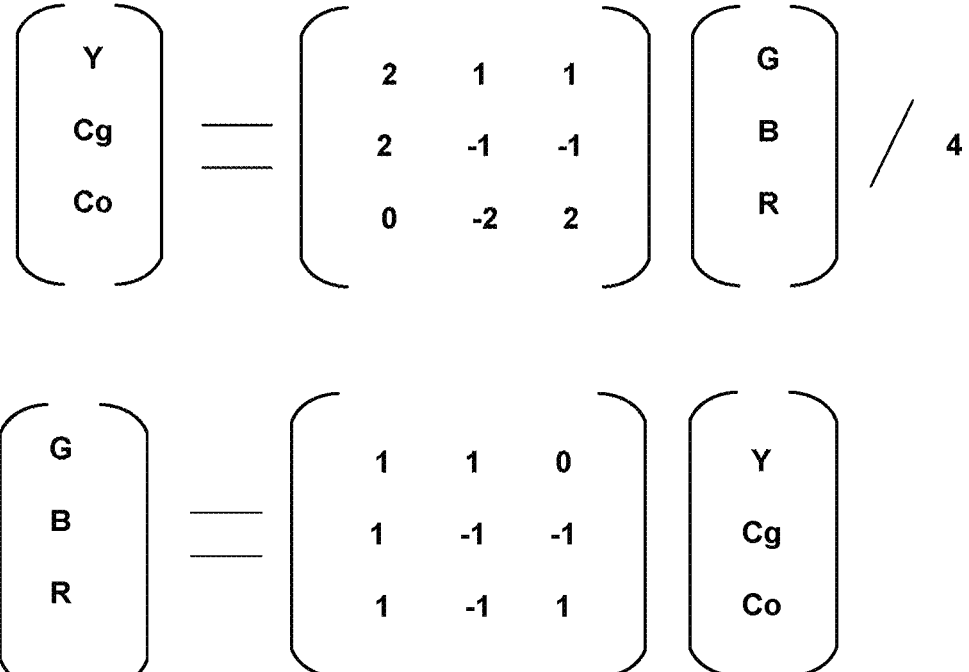
FIGS. 5A and 5B are block diagrams illustrating examples of applying the technique of adaptive color-space transform (ACT) to transform residuals between RGB color space and YCgCo color space in accordance with some implementations of the present disclosure.
Figure 5B:
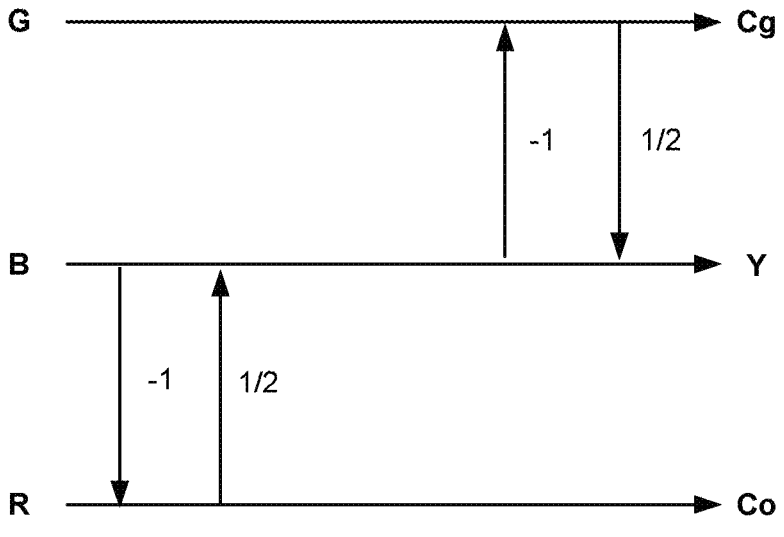
Figure 5B:
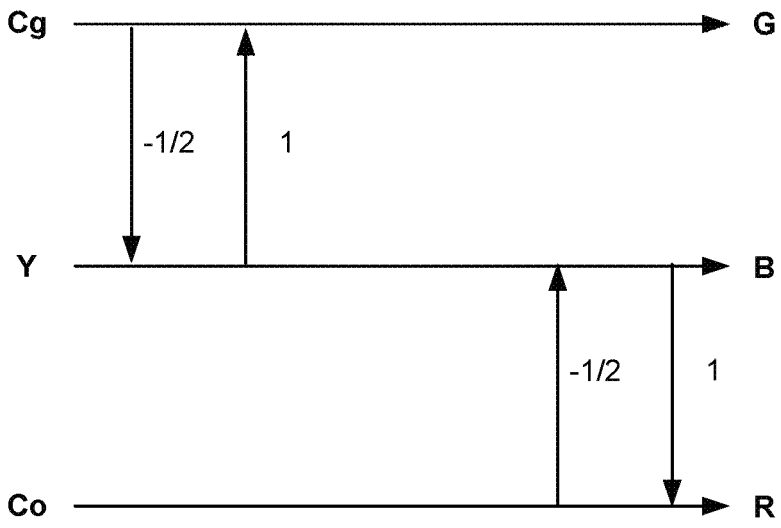

FIGS. 5A through 5B are block diagrams illustrating examples of applying the technique of adaptive color-space transform (ACT) to transform residuals between RGB color space and YCgCo color space in accordance with some implementations of the present disclosure.

In the HEVC screen content coding extension, ACT is applied to adaptively transform residuals from one color space (e.g., RGB) into another color space (e.g., YCgCo) such that the correlation (e.g., redundancy) between three color components (e.g., R, G, and B) are significantly reduced in the YCgCo color space. Further, in the existing ACT design, the adaptation of different color spaces is carried out at transform unit (TU) level by signaling one flag tu_act_enabled_flag for each TU. When the flag tu_act_enabled_flag is equal to one, it indicates that the residuals of the current TU is coded in the YCgCo space; otherwise (i.e., the flag is equal to 0), it indicates that the residuals of the current TU is coded in the original color space (i.e., without color space conversion). Additionally, depending on whether the current TU is coded in lossless mode or in lossy mode, different color space transform formulas are applied. Specifically, the forward and the inverse color space transform formulas between the RGB color space and the YCgCo color space for lossy modes are defined in FIG. 5A.

For lossless mode, the reversible version of RGB-YCgCo transform (also known as YCgCo-LS) is used. The reversible version of RGB-YCgCo transform is implemented based on lifting operations depicted in FIG. 5B and the related description.

As shown in FIG. 5A, the forward and inverse color transform matrices used in lossy mode are not normalized. Therefore, the magnitude of the YCgCo signal is smaller than that of the original signal after the color transform is applied. In order to compensate the decrease in magnitude caused by the forward color transform, an adjusted quantization parameter is applied to the residuals in the YCgCo domain. Specifically, when the color space transform is applied, the QP values $QP_Y$, $QP_{Cg}$ and $QP_{Co}$, which are used to quantize the YCgCo domain residuals, are set to be QP–5, QP–5 and QP–3 respectively, where QP is the quantization parameter used in the original color space.

Figure 6:
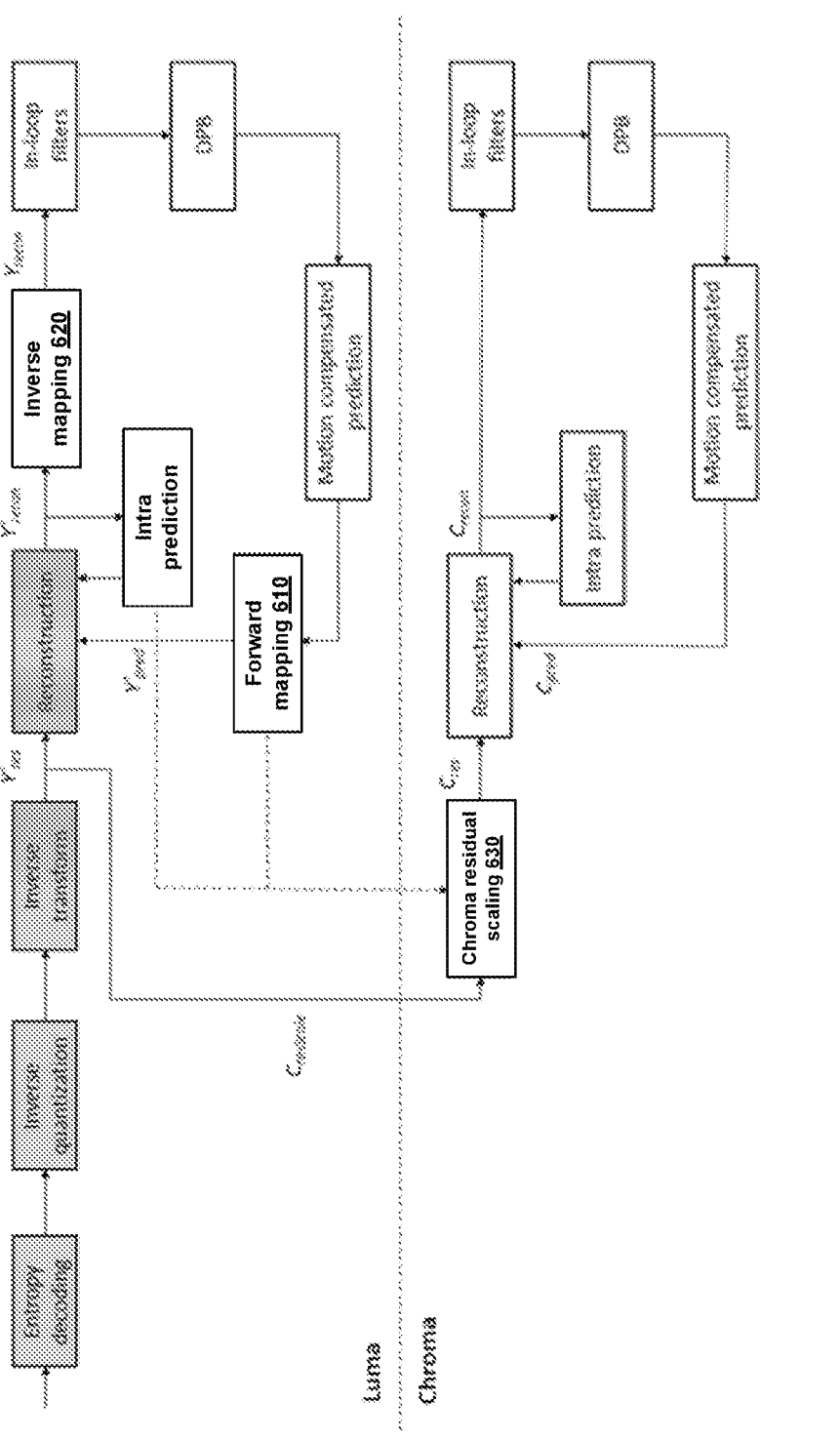
FIG. 6 is a block diagram of applying the technique of luma mapping with chroma scaling (LMCS) in an exemplary video data decoding process in accordance with some implementations of the present disclosure.

FIG. 6 is a block diagram of applying the technique of luma mapping with chroma scaling (LMCS) in an exemplary video data decoding process in accordance with some implementations of the present disclosure.

In the VVC, LMCS is used as a new coding tool applied before the in-loop filters (e.g., the de-blocking filter, the SAO and the ALF). In general, LMCS has two main modules: 1) in-loop mapping of the luma component based on adaptive piecewise linear models; 2) luma-dependent chroma residual scaling. FIG. 6 shows a modified decoding process with LMCS being applied. In FIG. 6, decoding modules that are conducted in the mapped domain include the entropy decoding module, the inverse quantization module, the inverse transform module, the luma intra prediction module, and the luma sample reconstruction module (i.e., the addition of the luma prediction samples and the luma residual samples). The decoding modules that are conducted in the original (i.e., non-mapped) domain include the motion compensated prediction module, the chroma intra prediction module, the chroma sample reconstruction module (i.e., the addition of the chroma prediction samples and the chroma residual samples), and all the in-loop filter modules such as the deblocking module, the SAO module, and the ALF module. The new operational modules introduced by LMCS include the forward mapping module 610 of luma samples, the inverse mapping module 620 of luma samples, and the chroma residual scaling module 630.

The in-loop mapping of LMCS can adjust the dynamic range of the input signal to improve the coding efficiency. The in-loop mapping of the luma samples in the existing LMCS design is built upon two mapping functions: one forward mapping function FwdMap and one corresponding inverse mapping function InvMap. The forward mapping function is signaled from encoder to decoder using one piecewise linear model with sixteen equal-size pieces. The inverse mapping function can be directly derived from the forward mapping function and therefore does not need to be signaled.

The parameters of luma mapping model are signaled at slice level. A presence flag is firstly signaled to indicate if luma mapping model is to be signaled for a current slice. If luma mapping model is present in the current slice, the corresponding piecewise linear model parameters are further signaled. Additionally, at slice level, another LMCS control flag is signaled to enable/disable LMCS for the slice.

Chroma residual scaling module 630 is designed to compensate for the interaction of quantization precision between the luma signal and its corresponding chroma signals when the in-loop mapping is applied to the luma signal. It is also signaled in the slice header whether chroma residual scaling is enabled or disabled for the current slice. If luma mapping is enabled, an additional flag is signaled to indicate if luma-dependent chroma residual scaling is applied or not. When luma mapping is not used, luma-dependent chroma residual scaling is always disabled and no additional flag is required. Additionally, the chroma residual scaling is always disabled for the CUs that contain less than or equal to four chroma samples.

Figure 7:
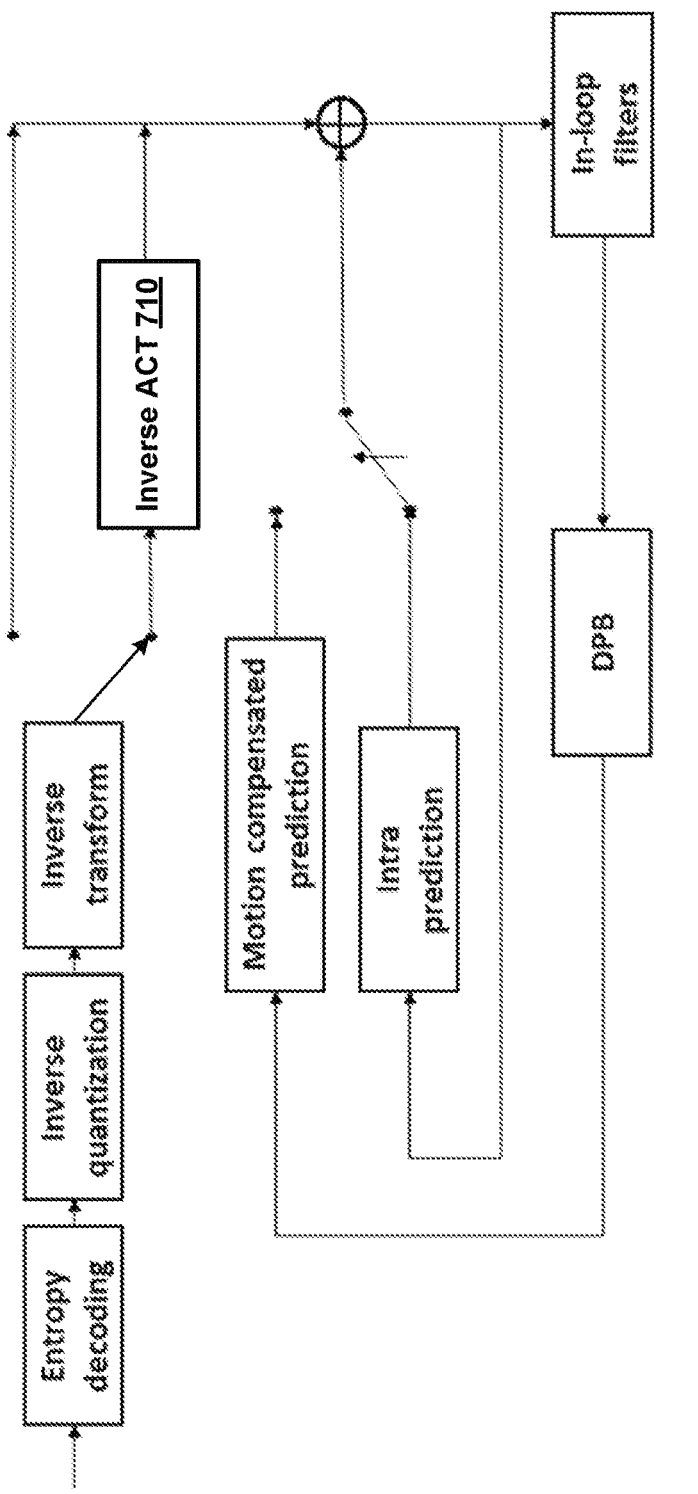
FIG. 7 is a block diagram illustrating an exemplary video decoding process by which a video decoder implements the technique of inverse adaptive color-space transform (ACT) in accordance with some implementations of the present disclosure.

FIG. 7 is a block diagram illustrating an exemplary video decoding process by which a video decoder implements the technique of inverse adaptive color-space transform (ACT) in accordance with some implementations of the present disclosure.

Similar to ACT design in the HEVC SCC, ACT in VVC converts the intra/inter prediction residuals of one CU in 4:4:4 chroma format from an original color space (e.g., RGB color space) into YCgCo color space. As a result, the redundancy between three color components can be reduced for better coding efficiency. FIG. 7 depicts the decoding flowchart in which how the inverse ACT is applied in the VVC framework through the addition of the inverse ACT module 710. When processing a CU encoded with ACT being enabled, the entropy decoding, the inverse quantization and the inverse DCT/DST-based transform first apply to the CU. After that, as depicted in FIG. 7, the inverse ACT is invoked to convert the decoded residuals from YCgCo color space to the original color space (e.g., RGB and YCbCr). Additionally, because ACT in lossy mode are not normalized, the QP adjustments of (–5, –5, –3) are applied to Y, Cg and Co components to compensate the changed magnitude of transformed residuals.

In some embodiments, ACT method reuses the same ACT core transforms of the HEVC to do the color conversion between different color spaces. Specifically, two different versions of color transforms are applied depending on whether a current CU is coded in lossy or lossless manner. The forward and inverse color transforms for lossy case use the irreversible YCgCo transform matrix as depicted in FIG. 5A. For the lossless case, the reversible color transform YCgCo-LS as shown in FIG. 5B is applied. Moreover, different from the existing ACT design, the following changes are introduced to the proposed ACT scheme to handle its interaction with the other coding tools in the VVC standard.

For example, because the residuals of one CU in the HEVC may be partitioned into multiple TUs, ACT control flag is separately signaled for each TU to indicate whether the color space conversion needs to be applied or not. However, as described above in connection with FIG. 4E, one quadtree nested with binary and ternary partition structure is applied in the VVC to replace the multiple partition type concept, thus removing the separate CU, PU and TU partitions in the HEVC. This means that in most cases one CU leaf node is also used as the unit of prediction and transform processing without further partition, unless the maximum supported transform size is smaller than the width or height of one component of the CU. Based on such partition structure, it is proposed in this disclosure to adaptively enable and disable ACT at CU level. Specifically, one flag cu_act_enabled_flag is signaled for each CU to select between the original color space and the YCgCo color space for coding the residuals of the CU. If the flag is equal to 1, it indicates that the residuals of all the TUs within the CU are coded in the YCgCo color space. Otherwise, if the flag cu_act_enabled_flag is equal to 0, all the residuals of the CU are coded in the original color space.

In some embodiments, a syntax element, e.g., sps_act_en-abled_flag, is added to the sequence parameter set (SPS) to indicate if ACT is enabled or not at the sequence level. In addition, as the color-space conversion is applied to video content whose luma and chroma components have the same resolution (e.g., 4:4:4 chroma format 4:4:4), one bitstream conformance requirement needs to be added such that ACT can be enabled only for 4:4:4 chroma format. Table 1 illustrates the modified SPS syntax table with the above syntax added.

TABLE 1

| Modified SPS syntax table | |
| --- | --- |
| | Descriptor |
| seq_parameter_set_rbsp( ) { | |
| ... | |
|    sps_act_enabled_flag | u(1) |
| ... | |
| } | |

Specifically, sps_act_enabled_flag equal to 1 indicates ACT is enabled and sps_act_enabled_flag equal to 0 indicates that ACT is disabled such that the flag cu_act_enabled_flag is not signaled for the CUs that refers to the SPS but inferred to be 0. When ChromaArrayType is not equal to 3, it is a requirement of the bitstream conformance that the value of sps_act_enabled_flag shall be equal to 0.

In another embodiment, instead of always signaling sps_act_enabled_flag, the signaling of the flag is conditioned on the chroma type of the input signal. Specifically, given that ACT can only be applied when luma and chroma components are in the same resolution, the flag sps_act_en-abled_flag is only signaled when the input video is captured in the 4:4:4 chroma format. With such change, the modified SPS syntax table is:

TABLE 2

| Modified SPS syntax table with Signaling Condition | |
| --- | --- |
| | Descriptor |
| seq_parameter_set_rbsp( ) { | |
| ... | |
|    if(chroma_format_idc == 3) | |
|      sps_act_enabled_flag | u(1) |
| ... | |
| } | |

In some embodiments, the syntax design specification for decoding video data using ACT is illustrated in the following table.

TABLE 3

| Specification for Signaling ACT Mode | |
| --- | --- |
| | Descriptor |
| coding_unit x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && | |
|     !( ( ( cbWidth = = 4 && cbHeight = = 4 ) \|\| modeType = = MODE_TYPE_INTRA ) | |
|     && !sps ibc enabled flag ) ) | |
|       cu_skip_flag[ x0 ][ y0 ] | ae(v) |
|     if( cu_skip_flag[ x0 ][ y0 ] = = 0 && slice_type != I | |
|     && ! ( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = = 0 ) \|\| | |
|       ( slice_type != I && ( CuPredMode[ chType ][ x0 ][ y0 ] != MODE_INTRA \|\| | |
|       ( cbWidth = = 4 && cbHeight = = 4 && cu_skip_flag[ x0 ][ y0 ] = = | |
| 0 ) ) ) ) && | |
|        cbWidth <= 64 && cbHeight <= 64 && modeType != MODE_TYPE_INTER | |
| && | |
|        sps_ibc_enabled_flag && treeType != DUAL_TREE_CHROMA ) | |
|       pred_mode_ibc_flag | ae(v) |
|       if( ( ( ( slice_type = = I\|\| (cbWidth = = 4 && cbHeight = = 4 ) sps \|\| ibc_enabled_flag | |
| ) && | |
|         CuPredMode[ x0 ][ y0 ] = = MODE_INTRA ) \|\| | |
|        ( slice_type != I && !( cbWidth = = 4 && cbHeight = = 4 ) && | |
| !sps_ibc_enabled_flag | |
|        && CuPredMode[ x0 ][ y0 ] != MODE_INTRA ) ) && | |
| sps_palette_enabled_flag && | |
|        cbWidth <= 64 && cbHeight <= 64 && && cu_skip_flag[ x0 ][ y0 ] = = 0 | |
| && | |
|        modeType != MODE_INTER ) | |
|       pred_mode_plt_flag | ae(v) |
|     } | |
|     if( CuPredMode[ chType ][ x0 ][ y0 ] == MODE_INTRA ) | |
|       cu_act_enabled_flag | ae(v) |
|     if( CuPredMode[ chType ][ x0 ][ y0 ] = = MODE_INTRA \|\| | |
|       CuPredMode[ chType ][ x0 ][ y0 ] = = MODE_PLT ) { | |
|       if( treeType = = SINGLE_TREE \|\| treeType = = DUAL_TREE_LUMA ) { | |
|         if( pred_mode_plt_flag ) { | |
|           if( treeType = = DUAL_TREE_LUMA ) | |
|             palette_coding( x0, y0, cbWidth, cbHeight, 0, 1 ) | |
|           else /* SINGLE_TREE */ | |
|             palette_coding( x0, y0, cbWidth, cbHeight, 0, 3 ) | |

TABLE 3-continued

| Specification for Signaling ACT Mode | |
| --- | --- |
| | Descriptor |

```
     } else {
       if( sps_bdpcm_enabled_flag &&
         cbWidth <= MaxTsSize && cbHeight <= MaxTsSize )
         intra_bdpcm_flag                                                        ae(v)
       if( intra_bdpcm_flag )
         intra_bdpcm_dir_flag                                                    ae(v)
       else {
         if( sps_mip_enabled_flag &&
           ( Abs( Log2( cbWidth) − Log2( cbHeight ) ) <= 2 ) &&
             cbWidth <= MaxTbSizeY && cbHeight <= MaxTbSizeY )
           intra_mip_flag[ x0 ][ y0 ]                                            ae(v)
         if( intra_mip_flag[ x0 ][ y0 ] )
           intra_mip_mode[ x0 ][ y0 ]                                            ae(v)
         else {
           if( sps_mrl_enabled_flag && ( ( y0 % CtbSizeY ) > 0 ) )
             intra_luma_ref_idx[ x0 ][ y0 ]                                      ae(v)
           if ( sps_isp_enabled_flag && intra_luma_ref_idx[ x0 ][ y0 ] == 0 &&
             ( cbWidth <= MaxTbSizeY && cbHeight <= MaxTbSizeY) &&
             ( cbWidth * cbHeight > MinTbSizeY * MinTbSizeY ) &&
   !cu_act_enabled_flag)
             intra_subpartitions_mode_flag[ x0 ][ y0 ]                           ae(v)
           if( intra_subpartitions_mode_flag[ x0 ][ y0 ] == 1 )
             intra_subpartitions_split_flag[ x0 ][ y0 ]                          ae(v)
           if( intra_luma_ref_idx[ x0 ][ y0 ] == 0 )
             intra_luma_mpm_flag[ x0 ][ y0 ]                                     ae(v)
           if( intra_luma_mpm_flag[ x0 ][ y0 ] ) {
             if( intra_luma_ref_idx[ x0 ][ y0 ] == 0 )
               intra_luma_not_planar_flag[ x0 ][ y0 ]                            ae(v)
             if( intra_luma_not_planar_flag[ x0 ][ y0 ] )
               intra_luma_mpm_idx[ x0 ][ y0 ]                                    ae(v)
           } else
             intra_luma_mpm_remainder[ x0 ][ y0 ]                               ae(v)
         }
       }
     }
   }
   if( ( treeType == SINGLE_TREE || treeType == DUAL_TREE_CHROMA ) &&
       ChromaArrayType != 0 ) {
     if ( pred_mode_plt_flag && treeType == DUAL_TREE_CHROMA )
       palette_coding( x0, y0, cbWidth / SubWidthC, cbHeight / SubHeightC, 1, 2 )
     else {
             if( !cu_act_enabled_flag ) {
       if( CclmEnabled)
         cclm_mode_flag                                                          ae(v)
       if( cclm_mode_flag )
         cclm_mode_idx                                                           ae(v)
       else
         intra_chroma_pred_mode                                                  ae(v)
             }
     }
   }
 } else if( treeType != DUAL_TREE_CHROMA) { /* MODE_INTER or MODE_IBC */
   if( cu_skip_flag[ x0 ][ y0 ] == 0 )
     general_merge_flag[ x0 ][ y0 ]                                              ae(v)
   if( general_merge_flag[ x0 ][ y0 ] ) {
     merge_data( x0, y0, cbWidth, cbHeight, chType )
   } else if ( CuPredMode[ chType ][ x0 ][ y0 ] == MODE_IBC ) {
     mvd_coding( x0, y0, 0, 0 )
     if( MaxNumIbcMergeCand > 1 )
       mvp_l0_flag[ x0 ][ y0 ]                                                   ae(v)
     if( sps_amvr_enabled_flag &&
       ( MvdL0[ x0 ][ y0 ][ 0 ] != 0 || MvdL0[ x0 ][ y0 ][ 1 ] != 0 ) ) {
       amvr_precision_idx[ x0 ][ y0 ]                                           ae(v)
     }
   } else {
     if( slice_type == B )
       inter_pred_idc[ x0 ][ y0 ]                                               ae(v)
     if( sps_affine_enabled_flag && cbWidth >= 16 && cbHeight >= 16 ) {
       inter_affine_flag[ x0 ][ y0 ]                                            ae(v)
       if( sps_affine_type_flag && inter_affine_flag[ x0 ][ y0 ] )
         cu_affine_type_flag[ x0 ][ y0 ]                                        ae(v)
     }
     if( sps_smvd_enabled_flag && !mvd_l1_zero_flag &&
       inter_pred_idc[ x0 ][ y0 ] == PRED_BI &&
       !inter_affine_flag[ x0 ][ y0 ] && RefIdxSymL0 > −1 && RefIdxSymL1 >
 −1)
```

TABLE 3-continued

| Specification for Signaling ACT Mode | Descriptor |
|---|---|

```
        sym_mvd_flag[ x0 ][ y0 ]                                              ae(v)
      if( inter_pred_idc[ x0 ][ y0 ] != PRED_L1 ) {
        if( NumRefIdxActive[ 0 ] > 1 && !sym_mvd_flag[ x0 ][ y0 ] )
          ref_idx_l0[ x0 ][ y0 ]                                             ae(v)
        mvd_coding( x0, y0, 0, 0 )
        if( MotionModelIdc[ x0 ][ y0 ] > 0 )
          mvd_coding( x0, y0, 0, 1 )
        if(MotionModelIdc[ x0 ][ y0 ] > 1 )
          mvd_coding( x0, y0, 0, 2 )
        mvp_l0_flag[ x0 ][ y0 ]                                              ae(v)
      } else {
        MvdL0[ x0 ][ y0 ][ 0 ] = 0
        MvdL0[ x0 ][ y0 ][ 1 ] = 0
      }
      if( inter_pred_idc[ x0 ][ y0 ] != PRED_L0 ) {
        if( NumRefIdxActive[ 1 ] > 1 && !sym_mvd_flag[ x0 ][ y0 ] )
          ref_idx_l1[ x0 ][ y0 ]                                            ae(v)
        if(mvd_l1_zero_flag && inter_pred_idc[ x0 ][ y0 ] = = PRED_BI ) {
          MvdL1[ x0 ][ y0 ][ 0 ] = 0
          MvdL1[ x0 ][ y0 ][ 1 ] = 0
          MvdCpL1[ x0 ][ y0 ][ 0 ][ 0 ] = 0
          MvdCpL1[ x0 ][ y0 ][ 0 ][ 1 ] = 0
          MvdCpL1[ x0 ][ y0 ][ 1 ][ 0 ] = 0
          MvdCpL1[ x0 ][ y0 ][ 1 ][ 1 ] = 0
          MvdCpL1[ x0 ][ y0 ][ 2 ][ 0 ] = 0
          MvdCpL1[ x0 ][ y0 ][ 2 ][ 1 ] = 0
        } else {
          if( sym_mvd_flag[ x0 ][ y0 ] ) {
          MvdL1[ x0 ][ y0 ][ 0 ] = −MvdL0[ x0 ][ y0 ][ 0 ]
          MvdL1[ x0 ][ y0 ][ 1 ] = −MvdL0[ x0 ][ y0 ][ 1 ]
        } else
          mvd_coding( x0, y0, 1, 0 )
        if( MotionModelIdc[ x0 ][ y0 ] > 0 )
          mvd_coding( x0, y0, 1, 1 )
        if(MotionModelIdc[ x0 ][ y0 ] > 1 )
          mvd_coding( x0, y0, 1, 2 )
        mvp_l1_flag[ x0 ][ y0 ]                                             ae(v)
        }
      } else {
        MvdL1[ x0 ][ y0 ][ 0 ] = 0
        MvdL1[ x0 ][ y0 ][ 1 ] = 0
      }
      if( ( sps_amvr_enabled_flag && inter_affine_flag[ x0 ][ y0 ] = = 0 &&
          ( MvdL0[ x0 ][ y0 ][ 0 ] != 0 || MvdL0[ x0 ][ y0 ][ 1 ] != 0 ||
          MvdL1[ x0 ][ y0 ][ 0 ] != 0 || MvdL1[ x0 ][ y0 ][ 1 ] != 0 ) ) ||
          ( sps_affine_amvr_enabled_flag && inter_affine_flag[ x0 ][ y0 ] = = 1 &&
          ( MvdCpL0[ x0 ][ y0 ][ 0 ][ 0 ] != 0 || MvdCpL0[ x0 ][ y0 ][ 0 ][ 1 ] != 0 ||
          MvdCpL1[ x0 ][ y0 ][ 0 ][ 0 ] != 0 || MvdCpL1[ x0 ][ y0 ][ 0 ][ 1 ] != 0
||
          MvdCpL0[ x0 ][ y0 ][ 1 ][ 0 ] != 0 || MvdCpL0[ x0 ][ y0 ][ 1 ][ 1 ] != 0
||
          MvdCpL1[ x0 ][ y0 ][ 1 ][ 0 ] != 0 || MvdCpL1[ x0 ][ y0 ][ 1 ][ 1 ] != 0
||
          MvdCpL0[ x0 ][ y0 ][ 2 ][ 0 ] != 0 || MvdCpL0[ x0 ][ y0 ][ 2 ][ 1 ] != 0
||
          MvdCpL1[ x0 ][ y0 ][ 2 ][ 0 ] != 0 || MvdCpL1[ x0 ][ y0 ][ 2 ][ 1 ] !=
0 ) ) {
        amvr_flag[ x0 ][ y0 ]                                               ae(v)
        if(amvr_flag[ x0 ][ y0 ] )
          amvr_precision_idx[ x0 ][ y0 ]                                    ae(v)
      }
        if( sps_bcw_enabled_flag && inter_pred_idc[ x0 ][ y0 ] = = PRED_BI &&
          luma_weight_l0_flag[ ref_idx_10 [ x0 ][ y0 ] ] = = 0 &&
          luma_weight_l1_flag[ ref_idx_11 [ x0 ][ y0 ] ] = = 0 &&
          chroma_weight_l0_flag[ ref_idx_10 [ x0 ][ y0 ] ] = = 0 &&
          chroma_weight_l1_flag[ ref_idx_11 [ x0 ][ y0 ] ] = = 0 &&
          cbWidth * cbHeight >= 256 )
        bcw_idx[ x0 ][ y0 ]                                                 ae(v)
      }
    }
    if( CuPredMode[ chType ][ x0 ][ y0 ] != MODE_INTRA && pred_mode_plt_flag
&&
      general_merge_flag[ x0 ][ y0 ] = = 0 )
      cu_cbf                                                                ae(v)
```

TABLE 3-continued

| Specification for Signaling ACT Mode | |
| --- | --- |
| | Descriptor |
| if( cu_cbf ) { | |
|   if( CuPredMode[ chType ][ x0 ][ y0 ] = = MODE_INTER && | |
| sps_sbt_enabled_flag | |
|     && !ciip_flag[ x0 ][ y0 ] && !MergeTriangleFlag[ x0 ][ y0 ] ) { | |
|     if( cbWidth <= MaxSbtSize && cbHeight <= MaxSbtSize ) { | |
|       allowSbtVerH = cbWidth >= 8 | |
|       allowSbtVerQ = cbWidth >= 16 | |
|       allowSbtHorH = cbHeight >= 8 | |
|       allowSbtHorQ = cbHeight >= 16 | |
|       if( allowSbtVeHr \|\| allowSbtHorH \|\|      allowSbtVerQ \|\| | |
| allowSbtHorQ ) | |
|         cu_sbt_flag | ae(v) |
|     } | |
|     if( cu_sbt_flag ) { | |
|       if( ( allowSbtVerH \|\| allowSbtHorH ) && ( allowSbtVerQ \|\| | |
| allowSbtHorQ) ) | |
|         cu_sbt_quad_flag | ae(v) |
|       if( (cu_sbt_quad_flag && allowSbtVerQ && allowSbtHorQ ) \|\| | |
|        ( !cu_sbt_quad_flag && allowSbtVerH && allowSbtHorH ) ) | |
|         cu_sbt_horizontal_flag | ae(v) |
|         cu_sbt_pos_flag | ae(v) |
|     } | |
|       if( sps_act_enabled_flag && CuPredMode[ chType ][ x0 ][ y0 ] != | |
| MODE_INTRA ) | |
|         cu_act_enabled_flag | ae(v) |
|   } | |
|   LfnstDcOnly = 1 | |
|   LfnstZeroOutSigCoeffFlag = 1 | |
|   transform_tree( x0, y0, cbWidth, cbHeight, treeType ) | |
|   lfnstWidth = (treeType = = DUAL_TREE_CHROMA) ? cbWidth / SubWidthC | |
|        : cbWidth | |
|   lfnstHeight = (treeType = = DUAL_TREE_CHROMA) ? cbHeight / SubHeightC | |
|        : cbHeight | |
|   if( Min( lfnstWidth, lfnstHeight ) >= 4 && sps_lfnst_enabled_flag = = 1 && | |
|     CuPredMode[ chType ][ x0 ][ y0 ] = = MODE_INTRA && | |
|     IntraSubPartitionsSplitType = = ISP_NO_SPLIT && | |
|     ( !intra_mip_flag[ x0 ][ y0 ] \|\| Min( lfnstWidth, lfnstHeight ) >= 16 ) && | |
|     tu_mts_idx[ x0 ][ y0 ] = = 0 && Max( cbWidth, cbHeight) <= MaxTbSizeY) { | |
|     if( LfnstDcOnly = = 0 && LfnstZeroOutSigCoeffFlag = = 1 ) | |
|     lfnst_idx[ x0 ][ y0 ] | ae(v) |
|   } | |
| } | |

The flag cu_act_enabled_flag equal to 1 indicates that the residuals of the coding unit are coded in the YCgCo color space and the flag cu_act_enabled_flag equal to 0 indicates that the residuals of the coding unit are coded in the original color space (e.g., RGB or YCbCr). When the flag cu_act_enabled_flag is not present, it is inferred to be equal to 0.

Figure 8A:
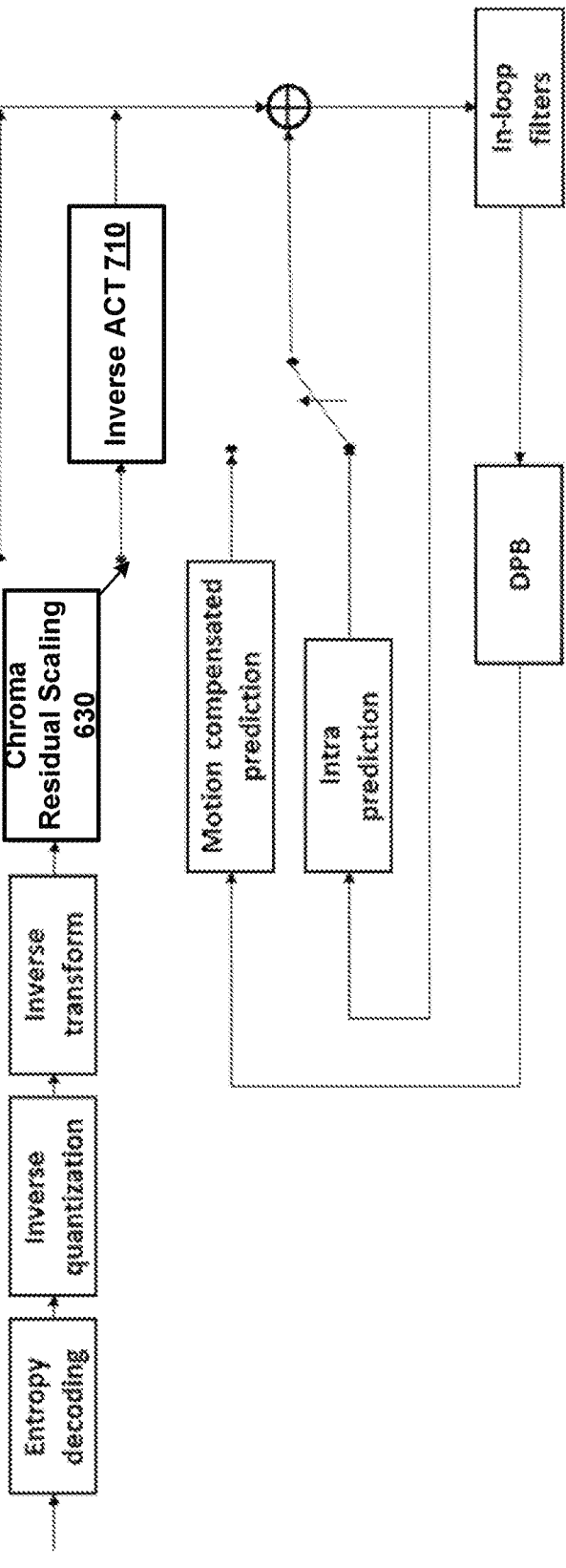
FIGS. 8A and 8B are block diagrams illustrating exemplary video decoding processes by which a video decoder implements the technique of inverse adaptive color-space transform (ACT) and luma mapping with chroma scaling (LMCS) in accordance with some implementations of the present disclosure.
Figure 8B:
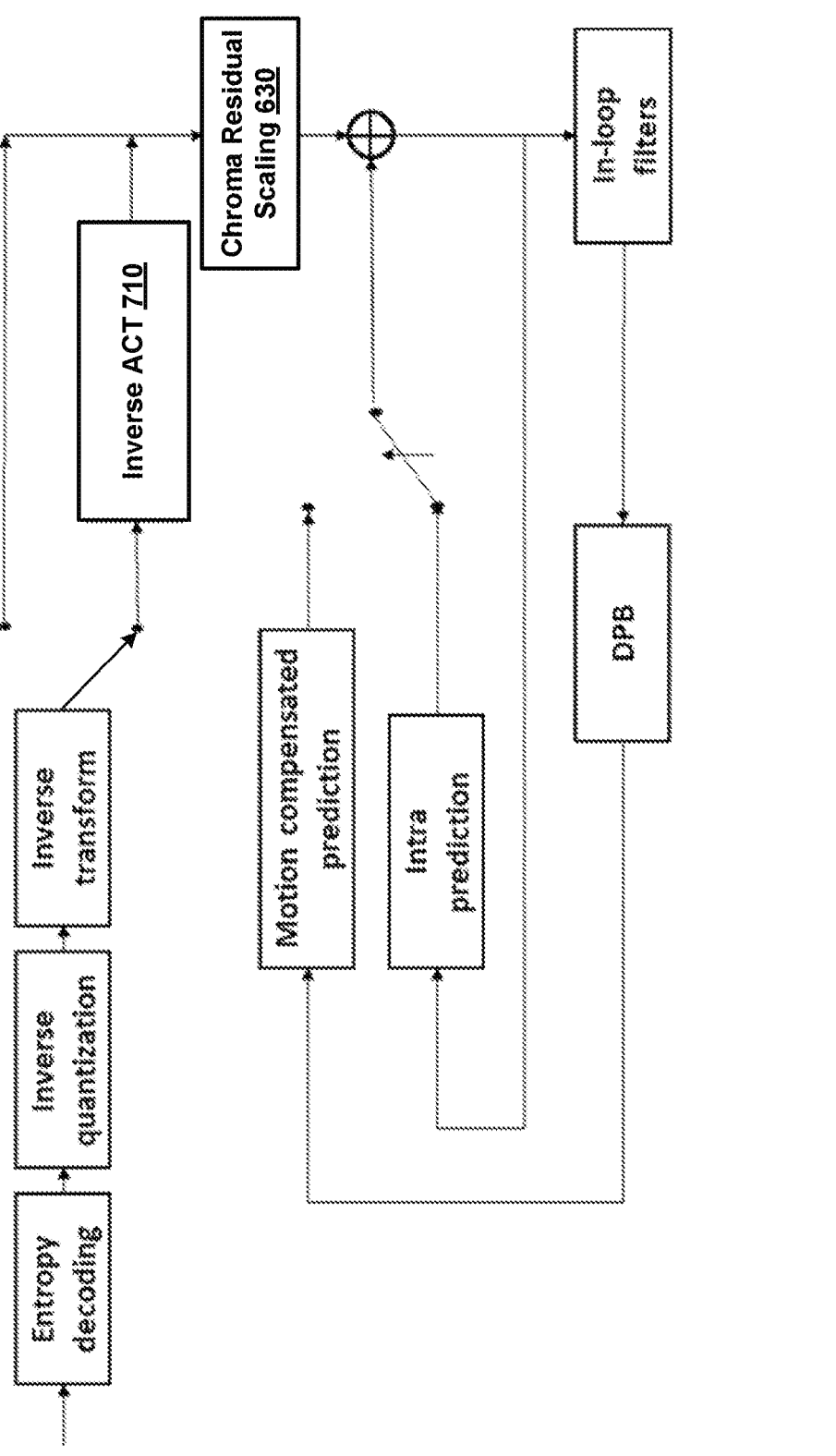

FIGS. 8A and 8B are block diagrams illustrating exemplary video decoding processes by which a video decoder implements the technique of inverse adaptive color-space transform (ACT) and luma mapping with chroma scaling in accordance with some implementations of the present disclosure. In some embodiments, the video bitstream is coded using both ACT (e.g., inverse ACT 710 in FIG. 7) and chroma residual scaling (e.g., chroma residual scaling 630 in FIG. 6). In some other embodiments, the video bitstream is coded using chroma residual scaling but not both ACT, thereby not requiring the inverse ACTT 710.

More specifically, FIG. 8A depicts an embodiment in which the video coder performs chroma residual scaling 630 before inverse ACT 710. As a result, the video coder performs luma mapping with chroma residual scaling 630 in the color-space transformed domain. For example, assuming that the input video is captured in RGB format and is transformed into YCgCo color space, the video coder performs chroma residual scaling 630 on the chroma residuals Cg and Co according to the luma residuals Y in the YCgCo color space.

FIG. 8B depicts an alternative embodiment in which the video coder performs chroma residual scaling 630 after the inverse ACT 710. As a result, the video coder performs luma mapping with chroma residual scaling 630 in the original color-space domain. For example, assuming the input video is captured in RGB format, the video coder applies chroma residual scaling on the B and R components.

Figure 9:
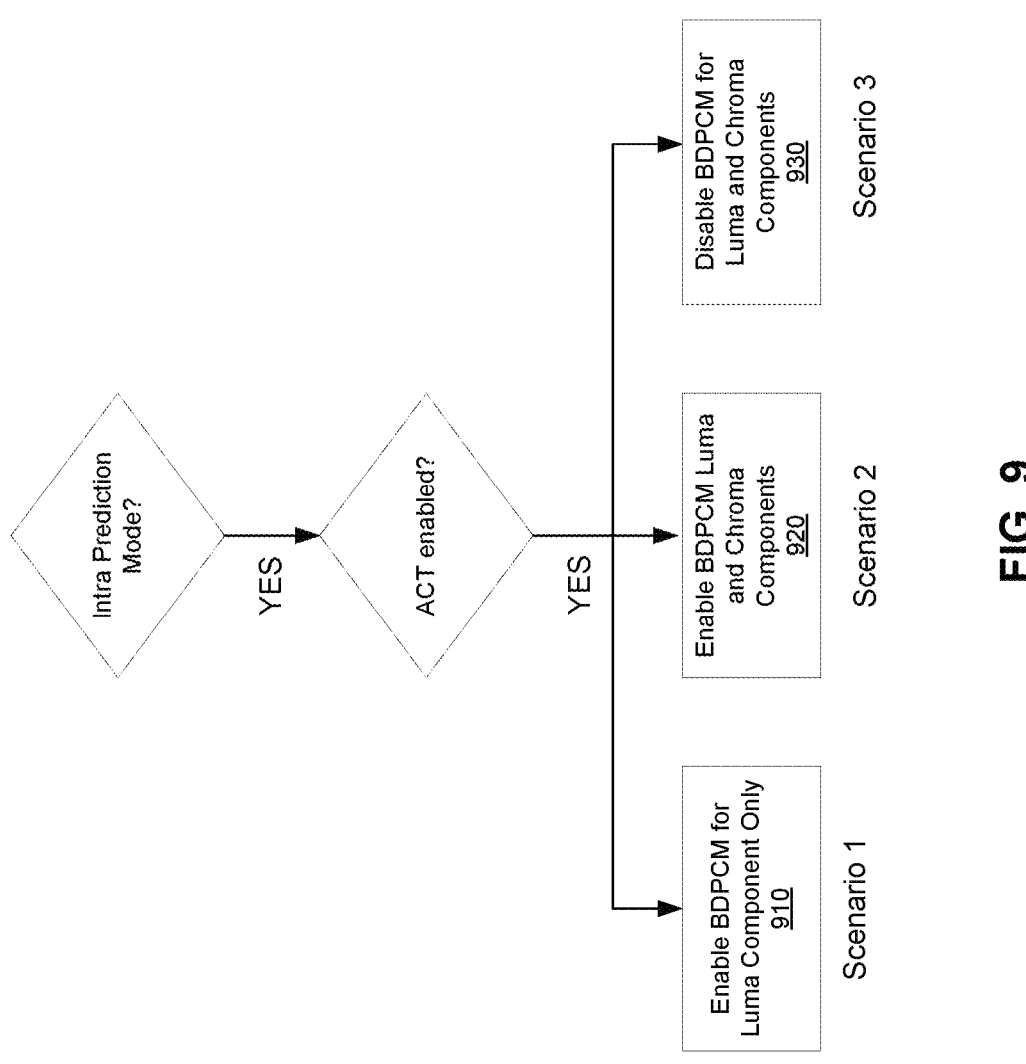
FIG. 9 is a block diagram illustrating exemplary decoding logics between performing adaptive color-space transform (ACT) and block differential pulse coded modulation (BDPCM) in accordance with some implementations of the present disclosure.

FIG. 9 is a block diagram illustrating exemplary decoding logics between performing adaptive color-space transform (ACT) and block differential pulse coded modulation (BDPCM) in accordance with some implementations of the present disclosure.

BDPCM is a coding tool for screen content coding. In some embodiments, a BDPCM enable flag is signaled in the SPS at the sequence level. The BDPCM enable flag is signaled only if the transform skip mode is enabled in the SPS.

When BDPCM is enabled, a flag is transmitted at the CU level if the CU size is smaller than or equal to MaxTsSizex MaxTsSize in terms of luma samples and if the CU is intra coded, where MaxTsSize is the maximum block size for which the transform skip mode is allowed. This flag indicates whether regular intra coding or BDPCM is used. If BDPCM is used, another BDPCM prediction direction flag is further transmitted to indicate whether the prediction is horizontal or vertical. Then, the block is predicted using the regular horizontal or vertical intra prediction process with unfiltered reference samples. The residual is quantized and the difference between each quantized residual and its predictor, i.e. the previously coded residual of the horizontal or vertical (depending on BDPCM prediction direction) neighbouring position, is coded.

For a block of size M (height)×N (width), let $r_{i,j}$, $0 \leq i \leq M-1$, $0 \leq j \leq N-1$ be the prediction residual. Let Q $(r_{i,j})$, $0 \leq i \leq M-1$, $0 \leq j \leq N-1$ denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical BDPCM prediction mode, for $0 \leq j \leq (N-1)$, the following is used to derive $\tilde{r}_{i,j}$:

$$\tilde{r}_{i,j} = \begin{cases} Q(r)_{i,j}, & i = 0 \\ Q(r)_{i,j} - Q(r_{(i-1),j}), & 1 \leq i \leq (M-1) \end{cases} \quad (1)$$

For horizontal BDPCM prediction mode, for $0 \leq i \leq (M-1)$, the following is used to derive $\tilde{r}_{i,j}$:

$$\tilde{r}_{i,j} = \begin{cases} Q(r)_{i,j}, & j = 0 \\ Q(r)_{i,j} - Q(r_{i,(j-1)}), & 1 \leq j \leq (N-1) \end{cases} \quad (2)$$

At the decoder side, the above process is reversed to compute $Q(r_{i,j})$, $0 \leq i \leq M-1$, $0 \leq j \leq N-1$, as follows:

$$Q(r_{i,j}) = \sum_{k=0}^{i} \tilde{r}_{k,j}, \quad (3)$$

if vertical BDPCM is used $$Q(r_{i,j}) = \sum_{k=0}^{j} \tilde{r}_{i,k}, \quad (4)$$

if horizontal BDPCM is used

The inverse quantized residuals, $Q^{-1}(Q(r_{i,j}))$, are added to the intra block prediction values to produce the reconstructed sample values.

The predicted quantized residual values $\tilde{r}_{i,j}$ are sent to the decoder using the same residual coding process as that in transform skip mode residual coding. In terms of the MPM mode for future intra mode coding, horizontal or vertical prediction mode is stored for a BDPCM-coded CU if BDPCM prediction direction is horizontal or vertical, respectively. For deblocking, if both blocks on the sides of a block boundary are coded using BDPCM, then that particular block boundary is not deblocked. According to the latest VVC working draft, when the input video is 4:4:4 chroma format, BDPCM can be applied to both luma and chroma components by signaling two separate flags, i.e., intra_bdpcm_luma_flag and intra_bdpcm_chroma_flag, for luma and chroma channel at CU-level.

In some embodiments, the video coder performs different logics to better handle the interaction between ACT and BDPCM. For example, when ACT is applied to one intra CU, BDPCM is enabled for luma component but disabled for chroma components (910). The corresponding modified syntax table of coding unit is illustrated as follows:

TABLE 4

| BDPCM enabled for luma component only | |
|---|---|
| | Descriptor |
| coding_unit( x0, y0, cbWidth, cbHeight, cqtDepth, treeType, mode Type ) { | |
| ...... | |
|   if( CuPredMode[ chType ][ x0 ][ y0 ] == MODE_INTRA && treeType == SINGLE_TREE ) | |
|     cu_act_enabled_flag | ae(v) |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) { | |
|         if( treeType = = DUAL_TREE_LUMA ) | |
|           palette_coding( x0, y0, cbWidth, cbHeight, 0, 1 ) | |
|         else /* SINGLE_TREE */ | |
|           palette_coding( x0, y0, cbWidth, cbHeight, 0, 3 ) | |
|       } else { | |
|         if( sps_bdpcm_enabled_flag && | |
|           cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | ae(v) |
|         else { | |
|           if( sps_mip_enabled_flag && | |
|             ( Abs( Log2( cbWidth ) − Log2( cbHeight ) ) <= 2 ) && | |
|              cbWidth <= MaxTbSizeY && cbHeight <= MaxTbSizeY ) | |
|             intra_mip_flag[ x0 ][ y0 ] | ae(v) |
|           if( intra_mip_flag[ x0 ][ y0 ] ) | |
|             intra_mip_mode[ x0 ][ y0 ] | ae(v) |
|           else { | |
|             if( sps_mrl_enabled_flag && ( ( y0 % CtbSizeY ) > 0 ) ) | |
|              intra_luma_ref_idx[ x0 ][ y0 ] | ae(v) |
|             if ( sps_isp_enabled_flag && intra_luma_ref_idx[ x0 ][ y0 ] = = 0 && | |
|               ( cbWidth <= MaxTbSizeY && cbHeight <= MaxTbSizeY ) && | |
|               ( cbWidth * cbHeight > MinTbSizeY * MinTbSizeY ) && !cu_act_enabled_flag) | |
|               intra_subpartitions_mode_flag[ x0 ][ y0 ] | ae(v) |
|             if( intra_subpartitions_mode_flag[ x0 ][ y0 ] = = 1 ) | |
|               intra_subpartitions_split_flag[ x0 ][ y0 ] | ae(v) |
|             if( intra_luma_ref_idx[ x0 ][ y0 ] = = 0 ) | |

TABLE 4-continued

| BDPCM enabled for luma component only | |
| --- | --- |
| | Descriptor |
| intra_luma_mpm_flag[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |
| } | |
| if( ( treeType = = SINGLE_TREE \|\| treeType = = DUAL_TREE_CHROMA ) && | |
| ChromaArrayType != 0 ) { | |
| if ( pred_mode_plt_flag && treeType = = DUAL_TREE_CHROMA ) | |
| palette_coding( x0, y0, cbWidth / SubWidthC, cbHeight / SubHeightC, 1, 2 ) | |
| else { | |
| if( !cu_act_enabled_flag ) { | |
| if( cbWidth <= MaxTsSize && cbHeight <= MaxTsSize && | |
| sps_bdpcm_chroma_enabled_flag ) { | |
| intra_bdpcm_chroma_flag | ae(v) |
| if( intra_bdpcm_chroma_flag ) | |
| intra_bdpcm_chroma_dir_flag | ae(v) |
| } else { | |
| if( CclmEnabled ) | |
| cclm_mode_flag | ae(v) |
| if( cclm_mode_flag ) | |
| cclm_mode_idx | ae(v) |
| else | |
| intra_chroma_pred_mode | ae(v) |
| } | |
| } | |
| } | |
| } | |
| } | |
| ...... | |
| } | |

In some embodiments, BDPCM is enabled for both luma and chroma components when ACT is applied to one intra CU (920). The corresponding modified syntax table of coding unit is illustrated as follows:

TABLE 5

| BDPCM enabled for both luma and chroma components | |
| --- | --- |
| | Descriptor |
| coding_unit( x0, y0, cbWidth, cbHeight, cqtDepth, treeType, modeType ) { | |
| ...... | |
| if( CuPredMode[ chType ][ x0 ][ y0 ] == MODE_INTRA && treeType == SINGLE_TREE ) | ae(v) |
| cu_act_enabled_flag | |
| if( CuPredMode[ chType ][ x0 ][ y0 ] = = MODE_INTRA \|\| | |
| CuPredMode[ chType ][ x0 ][ y0 ] = = MODE_PLT ) { | |
| if( treeType = = SINGLE_TREE \|\| treeType = = DUAL_TREE_LUMA ) { | |
| if( pred_mode_plt_flag ) { | |
| if( treeType = = DUAL_TREE_LUMA ) | |
| palette_coding( x0, y0, cbWidth, cbHeight, 0, 1 ) | |
| else /* SINGLE_TREE */ | |
| palette_coding( x0, y0, cbWidth, cbHeight, 0, 3 ) | |
| } else { | |
| if( sps_bdpcm_enabled_flag && | |
| cbWidth <= MaxTsSize && cbHeight <= MaxTsSize ) | |
| intra_bdpcm_flag | ae(v) |
| if( intra_bdpcm_flag ) | |
| intra_bdpcm_dir_flag | ae(v) |
| else { | |
| if( sps_mip_enabled_flag && | |
| ( Abs( Log2( cbWidth) − Log2( cbHeight)) <= 2 ) && | |
| cbWidth <= MaxTbSize Y && cbHeight <= MaxTbSizeY ) | |
| intra_mip_flag[ x0 ][ y0 ] | ae(v) |
| if( intra_mip_flag[ x0 ][ y0 ] ) | |
| intra_mip_mode[ x0 ][ y0 ] | ae(v) |
| else { | |
| if( sps_mrl_enabled_flag && ( ( y0 % CtbSizeY ) > 0 ) ) | |

TABLE 5-continued

| BDPCM enabled for both luma and chroma components | |
|---|---|
| | Descriptor |
| intra_luma_ref_idx[ x0 ][ y0 ] | ae(v) |
| if ( sps_isp_enabled_flag && intra_luma_ref_idx[ x0 ][ y0 ] = = 0 && | |
| ( cbWidth <= MaxTbSizeY && cbHeight <= MaxTbSizeY ) && | |
| ( cbWidth * cbHeight > MinTbSizeY * MinTbSizeY ) && !cu_act_enabled_flag) | |
| intra_subpartitions_mode_flag[ x0 ][ y0 ] | ae(v) |
| if( intra_subpartitions_mode_flag[ x0 ][ y0 ] = = 1 ) | |
| intra_subpartitions_split_flag[ x0 ][ y0 ] | ae(v) |
| if( intra_luma_ref_idx[ x0 ][ y0 ] = = 0 ) | |
| intra_luma_mpm_flag[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |
| } | |
| if( ( treeType = = SINGLE_TREE \|\| treeType = = DUAL_TREE_CHROMA ) && | |
| ChromaArrayType != 0 ) { | |
| if ( pred_mode_plt_flag && treeType = = DUAL_TREE_CHROMA ) | |
| palette_coding( x0, y0, cbWidth / SubWidthC, cbHeight / SubHeightC, 1, 2 ) | |
| else { | |
| if( cbWidth <= MaxTsSize && cbHeight <= MaxTsSize && | |
| sps_bdpcm_chroma_enabled_flag ) { | |
| intra_bdpcm_chroma_flag | ae(v) |
| if( intra_bdpcm_chroma_flag ) | |
| intra_bdpcm_chroma_dir_flag | ae(v) |
| } else { | |
| if( !cu_act_enabled_flag ) { | |
| if( CclmEnabled ) | |
| cclm_mode_flag | ae(v) |
| if( cclm_mode_flag ) | |
| cclm_mode_idx | ae(v) |
| else | |
| intra_chroma_pred_mode | ae(v) |
| } | |
| } | |
| } | |
| } | |
| } | |
| ...... | |
| } | |

In some embodiments, BDPCM is disabled for both luma and chroma components when ACT is applied to one intra CU (930). In such case, there is no need for signaling the BDPCM related syntax element. The corresponding modified syntax table of coding unit is illustrated as follows:

TABLE 6

| BDPCM is disabled for both luma and chroma components | |
|---|---|
| | Descriptor |
| coding_unit( x0, y0, cbWidth, cbHeight, cqtDepth, treeType, modeType ) { | |
| ...... | |
| if( CuPredMode[ chType ][ x0 ][ y 0 ] == MODE_INTRA && treeType == SINGLE_TREE ) | |
| cu_act_enabled_flag | ae(v) |
| if( CuPredMode[ chType ][ x0 ][ y0 ] = = MODE_INTRA \|\| | |
| CuPredMode[ chType ][ x0 ][ y0 ] = = MODE_PLT ) { | |
| if( treeType = = SINGLE_TREE \|\| treeType = = DUAL_TREE_LUMA ) { | |
| if( pred_mode_plt_flag ) { | |
| if( treeType = = DUAL_TREE_LUMA ) | |
| palette_coding( x0, y0, cbWidth, cbHeight, 0, 1 ) | |
| else /* SINGLE_TREE */ | |
| palette_coding( x0, y0, cbWidth, cbHeight, 0, 3 ) | |
| } else { | |
| if( sps_bdpcm_enabled_flag && | |
| cbWidth <= MaxTsSize && cbHeight <= MaxTsSize && !cu_act_enabled_flag ) | |

TABLE 6-continued

BDPCM is disabled for both luma and chroma components

| | Descriptor |
|---|---|
| intra_bdpcm_flag | ae(v) |
| if( intra_bdpcm_flag ) | |
|   intra_bdpcm_dir_flag | ae(v) |
| else { | |
|   if( sps_mip_enabled_flag && | |
|     ( Abs( Log2( cbWidth ) − Log2( cbHeight )) <= 2 ) && | |
|       cbWidth <= MaxTbSizeY && cbHeight <= MaxTbSizeY ) | |
|       intra_mip_flag[ x0 ][ y0 ] | ae(v) |
|   if( intra_mip_flag[ x0 ][ y0 ] ) | |
|     intra_mip_mode[ x0 ][ y0 ] | ae(v) |
|   else { | |
|     if( sps_mrl_enabled_flag && ( ( y0 % CtbSizeY ) > 0 ) ) | |
|       intra_luma_ref_idx[ x0 ][ y0 ] | ae(v) |
|     if ( sps_isp_enabled_flag && intra_luma_ref_idx[ x0 ][ y0 ] = = 0 && | |
|       ( cbWidth <= MaxTbSizeY && cbHeight <= MaxTbSizeY ) && | |
|       ( cbWidth * cbHeight > MinTbSizeY * MinTbSizeY ) && | |
| !cu_act_enabled_flag ) | |
|       intra_subpartitions_mode_flag[ x0 ][ y0 ] | ae(v) |
|       if( intra_subpartitions_mode_flag[ x0 ][ y0 ] = = 1 ) | |
|         intra_subpartitions_split_flag[ x0 ][ y0 ] | ae(v) |
|       if( intra_luma_ref_idx[ x0 ][ y0 ] = = 0 ) | |
|         intra_luma_mpm_flag[ x0 ][ y0 ] | ae(v) |
|       if( intra_luma_mpm_flag[ x0 ][ y0 ] ) { | |
|         if( intra_luma_ref_idx[ x0 ][ y0 ] = = 0 ) | |
|           intra_luma_not_planar_flag[ x0 ][ y0 ] | ae(v) |
|         if( intra_luma_not_planar_flag[ x0 ][ y0 ] ) | |
|           intra_luma_mpm_idx[ x0 ][ y0 ] | ae(v) |
|       } else | |
|         intra_luma_mpm_remainder[ x0 ][ y0 ] | ae(v) |
|     } | |
|   } | |
|   } | |
| } | |
| if( ( treeType = = SINGLE_TREE || treeType = = DUAL_TREE_CHROMA ) && | |
|     ChromaArrayType != 0 ) { | |
|   if ( pred_mode_plt_flag && treeType = = DUAL_TREE_CHROMA ) | |
|     palette_coding( x0, y0, cbWidth / SubWidthC, cbHeight / SubHeightC, 1, 2 ) | |
|   else { | |
|       if( !cu_act_enabled_flag ) { | |
|       if( cbWidth <= MaxTsSize && cbHeight <= MaxTsSize && | |
|       sps_bdpcm_chroma_enabled_flag ) { | |
|       intra_bdpcm_chroma_flag | ae(v) |
|       if( intra_bdpcm_chroma_flag ) | |
|         intra_bdpcm_chroma_dir_flag | ae(v) |
|     } else { | |
|         if( CclmEnabled ) | |
|         cclm_mode_flag | ae(v) |
|         if( cclm_mode_flag ) | |
|         cclm_mode_idx | ae(v) |
|         else | |
|         intra_chroma_pred_mode | ae(v) |
|       } | |
|     } | |
|   } | |
|   } | |
| } | |
| } | |

FIG. 10 is a flowchart 1000 illustrating an exemplary process by which a video coder decodes video data by conditionally performing the technique of inverse adaptive color-space transform (ACT) based on the interaction between ACT and other coding tools (e.g., LMCS and BDPCM) in accordance with some implementations of the present disclosure.

As the first step, the video decoder receives, from bitstream, a first syntax element in a slice header of a slice that indicates whether luma mapping with chroma scaling (LMCS) is applied to a coding unit in the slice (1010).

The video decoder then receives, from the bitstream, a second syntax element (e.g., cu_act_enabled_flag) for the coding unit in the slice (1020). The second syntax element indicates whether the coding unit has been coded using adaptive color-space transform (ACT).

If the second syntax element has a non-zero value (e.g., indicating that the coding unit has been coded using ACT), the video decoder decodes the video data corresponding to the coding unit by applying inverse ACT to convert luma and chroma residuals of the coding unit from a transformed color space to an original color space of the video data (1030).

After applying the inverse ACT to convert the luma and chroma residuals of the coding unit, if the first syntax element has a non-zero value (e.g., indicating that the coding unit has been coded with LMCS), the video decoder decodes the video data corresponding to the coding unit by performing inverse luma mapping to the luma samples and inverse scaling to the chroma residuals of the coding unit (1040).

In some embodiments, before receiving the second syntax element, the video decoder decodes receives a third syntax element (e.g., chroma_format_idc) from the bitstream, wherein the third syntax element indicates whether the video data has a predefined chroma format. As noted above, the ACT is only enabled for certain predefined chroma format, e.g., 4:4:4 chroma format.

In some embodiments, the second syntax element (e.g., cu_act_enabled_flag) is present in the bitstream only when the video data has the predefined chroma format (e.g., the ACT is disabled when the video data is not 4:4:4 chroma format).

In some embodiments, the transformed color space is YCgCo color space while the original color space can be RGB color space or YCbCr color space.

In some embodiments, after performing inverse ACT to convert luma and chroma residuals of the coding unit, the video decoder performs inverse luma mapping to luma samples and inverse scaling to chroma residuals of the coding unit by: generating intermediate luma samples in a mapped domain of the coding unit by adding the luma residuals in the original color space to predicted luma samples, converting the intermediate luma samples in the mapped domain to reconstructed luma components in a pre-mapped domain using one or more adaptive piecewise linear models; inverse scaling the chroma residuals according to the corresponding intermediate luma samples in the mapped domain; and reconstructing chroma components of the coding unit using the scaled chroma residuals and predicted chroma samples.

In some embodiments, the video decoder receives, from bitstream, video data corresponding to a coding unit, wherein the coding unit is coded by intra-prediction mode. The video coder receives a first syntax element (e.g., cu_act_enabled_flag) from the video data, wherein the first syntax element indicates whether the coding unit has been coded using adaptive color-space transform (ACT). If the first syntax element has a zero value, the video coder receives one or more syntax elements (e.g., intra-_bdpcm_chroma_flag, intra_bdpcm_chroma_dir_flag) from the video data, wherein the one or more syntax elements indicate whether the chroma components of the coding unit has been coded using block differential pulse coded modulation (BDPCM). If the first syntax element has a non-zero value, the video coder assigns default values to the one or more syntax elements associated with the BDPCM. The default values may indicate that the chroma components of the coding unit is decoded using the inverse BDPCM or otherwise. The video coder then decodes the coding unit from the video data in accordance with the first syntax element associated with the ACT and the one or more syntax elements associated with the BDPCM.

In some embodiments, before receiving the first syntax element, the video decoder receives a second syntax element from the video data, wherein the second syntax element indicates whether the video data has a predefined chroma format. As noted above, the ACT is only enabled for certain predefined chroma format, e.g., 4:4:4 chroma format.

In some embodiments, the first syntax element is present in the bitstream only when the video data has the predefined chroma format.

In some embodiments, the coding unit is decoded using the inverse BDPCM when the coding unit is coded without applying color-space transforms.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed:

1. A method of video encoding, comprising:
determining whether a coding unit has been coded using adaptive color-space transform (ACT), wherein the coding unit is coded by intra-prediction mode;
in accordance with a determination that the coding unit has not been coded using ACT:

determining whether chroma components of the coding unit have been coded using block differential pulse coded modulation (BDPCM); and decoding chroma components of the coding unit based on the determination of whether the chroma components of the coding unit have been coded using BDPCM; and in accordance with a determination that the coding unit has been coded using ACT:

decoding the coding unit by applying inverse ACT.

2. The method of claim 1, wherein the method further comprises:

signaling a first syntax element, wherein the first syntax element indicates whether the coding unit has been coded using ACT;

in accordance with a determination that the first syntax element has a zero value:

signaling one or more syntax elements, wherein the one or more syntax elements indicate whether the chroma components of the coding unit have been coded using BDPCM; and in accordance with a determination that the first syntax element has a non-zero value:

not signaling the one or more syntax elements, wherein when the one or more syntax elements are not signaled, default values are assigned to the one or more syntax elements.

3. The method of claim 2, wherein the method further comprises:

signaling a second syntax element, wherein the second syntax element indicates whether video data has a predefined chroma format, wherein the signaling the first syntax element comprises:

in response to the second syntax element indicating that the video data has the predefined chroma format, signaling the first syntax element.

4. The method of claim 3, wherein the predefined chroma format is 4:4:4 chroma format.

5. The method of claim 3, wherein the first syntax element is signaled only when the video data has the predefined chroma format.

6. The method of claim 1, wherein the default values indicate that the chroma components of the coding unit are decoded without using inverse BDPCM.

7. The method of claim 1, wherein the coding unit is decoded using inverse BDPCM when the coding unit is coded without applying transforms.

8. An electronic apparatus comprising:

one or more processing units;

a memory coupled to the one or more processing units; and a plurality of programs stored in the memory that, when executed by the one or more processing units, cause the electronic apparatus to perform operations comprising:

determining whether a coding unit has been coded using adaptive color-space transform (ACT), wherein the coding unit is coded by intra-prediction mode;

in accordance with a determination that the coding unit has not been coded using ACT:

determining whether chroma components of the coding unit have been coded using block differential pulse coded modulation (BDPCM); and decoding chroma components of the coding unit based on the determination of whether the chroma components of the coding unit have been coded using BDPCM; and in accordance with a determination that the coding unit has been coded using ACT:

decoding the coding unit by applying inverse ACT.

9. The electronic apparatus of claim 8, wherein the operations further comprise:

signaling a first syntax element, wherein the first syntax element indicates whether the coding unit has been coded using ACT;

in accordance with a determination that the first syntax element has a zero value:

signaling one or more syntax elements, wherein the one or more syntax elements indicate whether the chroma components of the coding unit have been coded using BDPCM; and in accordance with a determination that the first syntax element has a non-zero value:

not signaling the one or more syntax elements, wherein when the one or more syntax elements are not signaled, default values are assigned to the one or more syntax elements.

10. The electronic apparatus of claim 9, wherein the operations further comprise:

signaling a second syntax element, wherein the second syntax element indicates whether video data has a predefined chroma format, wherein the signaling the first syntax element comprises:

in response to the second syntax element indicating that the video data has the predefined chroma format, signaling the first syntax element.

11. The electronic apparatus of claim 10, wherein the predefined chroma format is 4:4:4 chroma format.

12. The electronic apparatus of claim 10, wherein the first syntax element is signaled only when the video data has the predefined chroma format.

13. The electronic apparatus of claim 9, wherein the default values indicate that the chroma components of the coding unit are decoded without using inverse BDPCM.

14. The electronic apparatus of claim 8, wherein the coding unit is decoded using inverse BDPCM when the coding unit is coded without applying transforms.

15. A non-transitory computer readable storage medium having stored therein a bitstream comprising video information generated by a method of video encoding, the method comprising:

determining whether a coding unit has been coded using adaptive color-space transform (ACT), wherein the coding unit is coded by intra-prediction mode;

in accordance with a determination that the coding unit has not been coded using ACT:

determining whether chroma components of the coding unit have been coded using block differential pulse coded modulation (BDPCM); and decoding chroma components of the coding unit based on the determination of whether the chroma components of the coding unit have been coded using BDPCM; and in accordance with a determination that the coding unit has been coded using ACT:

decoding the coding unit by applying inverse ACT.

16. The non-transitory computer readable storage medium of claim 15, wherein the method further comprises:

signaling a first syntax element, wherein the first syntax element indicates whether the coding unit has been coded using ACT;

in accordance with a determination that the first syntax element has a zero value:

signaling one or more syntax elements, wherein the one or more syntax elements indicate whether the chroma components of the coding unit have been coded using BDPCM; and in accordance with a determination that the first syntax element has a non-zero value:

not signaling the one or more syntax elements, wherein when the one or more syntax elements are not signaled, default values are assigned to the one or more syntax elements.

17. The non-transitory computer readable storage medium of claim 16, wherein the method further comprises:

signaling a second syntax element, wherein the second syntax element indicates whether video data has a predefined chroma format, wherein the signaling the first syntax element comprises:

in response to the second syntax element indicating that the video data has the predefined chroma format, signaling the first syntax element.

18. The non-transitory computer readable storage medium of claim 17, wherein the predefined chroma format is 4:4:4 chroma format.

19. The non-transitory computer readable storage medium of claim 17, wherein the first syntax element is signaled only when the video data has the predefined chroma format.

20. The non-transitory computer readable storage medium of claim 16, wherein the default values indicate that the chroma components of the coding unit are decoded without using inverse BDPCM.

\* \* \* \* \*